(12) United States Patent
Song et al.

(10) Patent No.: US 12,164,082 B2
(45) Date of Patent: Dec. 10, 2024

(54) OPTICAL IMAGING LENS ASSEMBLY

(71) Applicant: ZHEJIANG SUNNY OPTICS CO., LTD., Zhejiang (CN)

(72) Inventors: Litong Song, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 708 days.

(21) Appl. No.: 17/352,398

(22) Filed: Jun. 21, 2021

(65) Prior Publication Data

US 2021/0396970 A1  Dec. 23, 2021

(30) Foreign Application Priority Data

Jun. 22, 2020 (CN) .......................... 202010574079.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/04; G02B 13/06
USPC ........................................ 359/755, 708, 751
See application file for complete search history.

(56) References Cited

U.S. PATENT DOCUMENTS

| 2019/0196144 A1* | 6/2019 | Chen | G02B 27/0025 |
| 2020/0012078 A1* | 1/2020 | Kuo | G02B 13/18 |
| 2021/0132340 A1* | 5/2021 | Wang | G02B 9/64 |
| 2021/0373284 A1* | 12/2021 | Wang | G02B 13/0045 |

FOREIGN PATENT DOCUMENTS

WO  WO-2021203425 A1 * 10/2021 ......... G02B 13/0045

OTHER PUBLICATIONS

Machine translation of WO 2021203425 A1 retrieved electronically from PE2E Search Feb. 3, 2024 (Year: 2024).*

* cited by examiner

*Primary Examiner* — Cara E Rakowski
(74) *Attorney, Agent, or Firm* — Samson G. Yu

(57) ABSTRACT

The disclosure provides an optical imaging lens assembly, which sequentially includes, from an object side to an image side along an optical axis: a first lens with a refractive power, an object-side surface thereof being a convex surface; a second lens with a refractive power; a third lens with a refractive power; a fourth lens with a positive refractive power; a fifth lens with a refractive power; a sixth lens with a negative refractive power; and a seventh lens with a negative refractive power, wherein a maximum field of view (FOV) of the optical imaging lens assembly satisfies 105°<FOV<125°.

18 Claims, 15 Drawing Sheets

OPTICAL IMAGING LENS ASSEMBLY

CROSS-REFERENCE TO RELATED APPLICATION(S)

The disclosure claims priority to and the benefit of Chinese Patent Application No. 202010574079.4, filed in the China National Intellectual Property Administration (CNIPA) on 22 Jun. 2020, which is incorporated herein by reference in its entirety.

TECHNICAL FIELD

The disclosure relates to the field of optical elements, and particularly to an optical imaging lens assembly.

BACKGROUND

In recent years, more and more electronic products on the market have had optical imaging functions, and meanwhile, requirements of users on imaging lenses applied to electronic products have also increased. With the gradual reduction of sizes of electronic products, optical imaging systems applied to electronic products have also been gradually developed to characteristics of small size, light weight, high pixel and the like. Meanwhile, with the increase of functions of electronic products, requirements of users on large field of view (FOV) of optical imaging systems applied thereto have also been increased.

SUMMARY

An aspect of the disclosure provides an optical imaging lens assembly, which sequentially includes, from an object side to an image side along an optical axis: a first lens with a refractive power, an object-side surface thereof being a convex surface; a second lens with a refractive power; a third lens with a refractive power; a fourth lens with a positive refractive power; a fifth lens with a refractive power; a sixth lens with a negative refractive power; and a seventh lens with a negative refractive power, wherein a maximum field of view (FOV) of the optical imaging lens assembly may satisfy: $105°<FOV<125°$.

In an implementation mode, the object-side surfaces of the first lens to an image-side surface of the seventh lens include at least one aspheric mirror surface.

In an implementation mode, a maximum effective radius DT12 of an image-side surface of the first lens and a maximum effective radius DT61 of an object-side surface of the sixth lens may satisfy $0.3<DT12/DT61<0.8$.

In an implementation mode, TTL is a distance from the object-side surface of the first lens to an imaging surface of the optical imaging lens assembly on the optical axis, and ImgH is a half of a diagonal length of an effective pixel region on the imaging surface of the optical imaging lens assembly, TTL and ImgH may satisfy: $0.3<ImgH/TTL<0.8$.

In an implementation mode, a total effective focal length f of the optical imaging lens assembly, an effective focal length f1 of the first lens and an effective focal length f7 of the seventh lens may satisfy: $-1.0<f/f1+f/f7<0$.

In an implementation mode, an effective focal length f2 of the second lens, a curvature radius R3 of an object-side surface of the second lens and a curvature radius R4 of an image-side surface of the second lens may satisfy: $0<f2/(R3-R4)<1.0$.

In an implementation mode, the total effective focal length f of the optical imaging lens assembly and a combined focal length f45 of the fourth lens and the fifth lens may satisfy: $0.5<f/f45<1.5$.

In an implementation mode, a combined focal length f23 of the second lens and the third lens and a combined focal length f67 of the sixth lens and the seventh lens may satisfy: $-2.0<f67/f23<-0.5$.

In an implementation mode, a curvature radius R1 of the object-side surface of the first lens and a curvature radius R2 of the image-side surface of the first lens may satisfy: $0<(R1-R2)/(R1+R2)<1.0$.

In an implementation mode, a curvature radius R5 of an object-side surface of the third lens and a curvature radius R6 of an image-side surface of the third lens may satisfy: $0.5<R6/R5<1.5$.

In an implementation mode, an effective focal length f4 of the fourth lens, an effective focal length f6 of the sixth lens, a curvature radius R7 of an object-side surface of the fourth lens and a curvature radius R12 of an image-side surface of the sixth lens may satisfy: $0.5<|R7/f4+R12/f6|<1.5$.

In an implementation mode, the optical imaging lens assembly further includes a diaphragm, and TD is a distance from the object-side surface of the first lens to the image-side surface of the seventh lens on the optical axis, and SL is a distance from the diaphragm to the imaging surface of the optical imaging lens assembly on the optical axis, TD and SL may satisfy: $0.5<TD/SL<1.0$.

In an implementation mode, a center thickness CT6 of the sixth lens on the optical axis and an edge thickness ET6 of the sixth lens may satisfy: $0.3<CT6/ET6<0.8$.

In an implementation mode, a curvature radius R10 of an image-side surface of the fifth lens, a curvature radius R13 of an object-side surface of the seventh lens and a curvature radius R14 of the image-side surface of the seventh lens may satisfy: $-1.0<(R13+R14)/R10<0$.

In an implementation mode, an edge thickness ET2 of the second lens and an edge thickness ET3 of the third lens may satisfy: $0.5<ET3/ET2<1.0$.

In an implementation mode, an edge thickness ET4 of the fourth lens and an edge thickness ET5 of the fifth lens may satisfy: $0.5<ET4/ET5<1.5$.

In an implementation mode, SAG42 is a distance from an intersection point of an image-side surface of the fourth lens and the optical axis to an effective radius vertex of the image-side surface of the fourth lens on the optical axis, and SAG51 is a distance from an intersection point of an object-side surface of the fifth lens and the optical axis to an effective radius vertex of the object-side surface of the fifth lens on the optical axis, SAG42 and SAG51 may satisfy: $0.3<SAG42/(SAG42+SAG51)<0.8$.

In an implementation mode, a center thickness CT1 of the first lens on the optical axis, a center thickness CT2 of the second lens on the optical axis, a center thickness CT4 of the fourth lens on the optical axis and a center thickness CT5 of the fifth lens on the optical axis may satisfy: $0.5<(CT1+CT2)/(CT4+CT5)<1.0$.

In an implementation mode, a spacing distance T12 of the first lens and the second lens on the optical axis and a sum $\Sigma AT$ of spacing distances of any two adjacent lenses in the first lens to the seventh lens on the optical axis may satisfy: $0.3<T12/\Sigma AT<0.8$.

In an implementation mode, the first lens has a negative refractive power, and the image-side surface thereof is a concave surface.

In an implementation mode, the second lens has a positive refractive power, the object-side surface thereof is a convex surface, while the image-side surface is a convex surface.

In an implementation mode, the image-side surface of the fifth lens is a convex surface.

In an implementation mode, the image-side surface of the sixth lens is a concave surface.

In an implementation mode, the object-side surface of the seventh lens is a convex surface, while the image-side surface is a concave surface.

Another aspect of the disclosure provides an optical imaging lens assembly, which sequentially includes, from an object side to an image side along an optical axis: a first lens with a refractive power, an object-side surface thereof being a convex surface; a second lens with a refractive power; a third lens with a refractive power; a fourth lens with a positive refractive power; a fifth lens with a refractive power; a sixth lens with a negative refractive power; and a seventh lens with a negative refractive power, wherein a curvature radius R1 of the object-side surface of the first lens and a curvature radius R2 of an image-side surface of the first lens may satisfy: $0<(R1-R2)/(R1+R2)<1.0$.

According to the disclosure, the refractive power is configured reasonably, and optical parameters are optimized, so that the provided optical imaging lens assembly is applicable to a portable electronic product and has the characteristics of wide angle, small size and high imaging quality.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
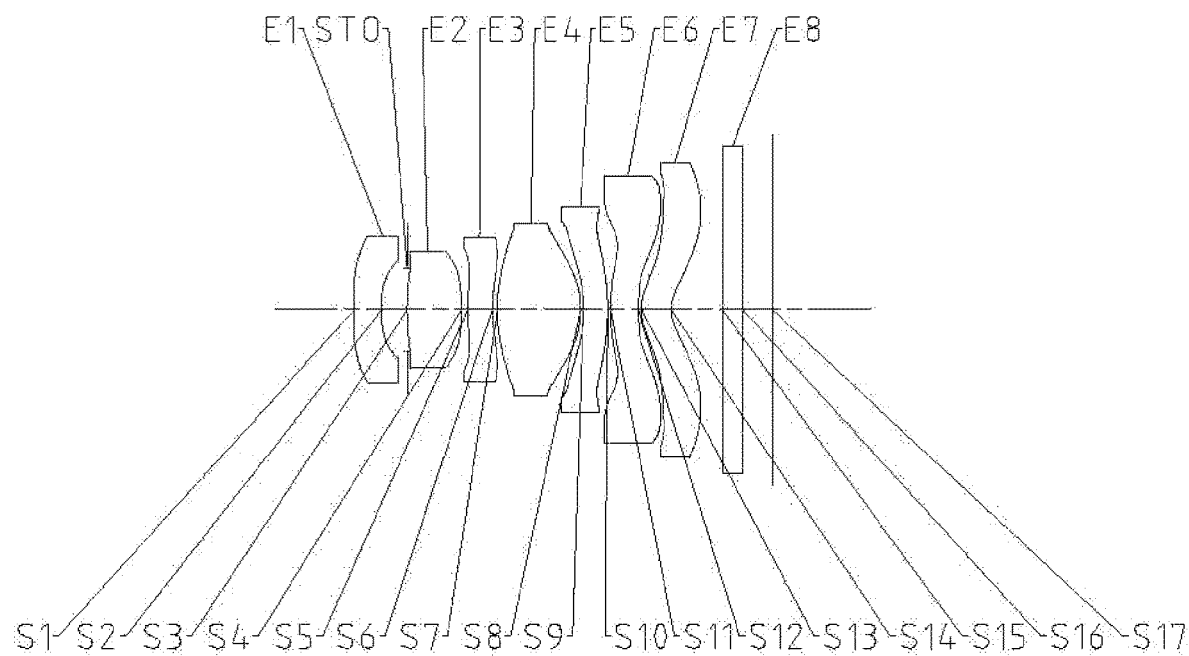
FIG. 1 shows a structure diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include seven lenses with a refractive power, i.e., a first lens, a second lens, a third lens, a fourth lens, a fifth lens, a sixth lens and a seventh lens respectively. The seven lenses are sequentially arranged from an object side to an image side along an optical axis. In the first lens to the seventh lens, there may be a spacing distance between any two adjacent lenses.

In an exemplary embodiment, the first lens may have a positive refractive power or a negative refractive power, and an object-side surface thereof may be a convex surface; the second lens may have a positive refractive power or a negative refractive power; the third lens may have a positive refractive power or a negative refractive power; the fourth lens may have a positive refractive power; the fifth lens may have a positive refractive power or a negative refractive power; the sixth lens may have a negative refractive power; and the seventh lens may have a negative refractive power. Such refractive power and surface type designs of the first lens to the seventh lens are favorable for correcting each aberration of the optical imaging lens assembly and may satisfy high-definition imaging of a wide-angle lens well.

In an exemplary embodiment, the optical imaging lens assembly according to the disclosure may satisfy $105°<FOV<125°$, wherein FOV is a maximum field of view of the optical imaging lens assembly. More specifically, FOV may further satisfy $111°<FOV<121°$. Satisfying $105°<FOV<125°$ is favorable for improving a relative illumination of the optical imaging lens assembly and further ensuring that an edge of a shot image also has relatively high luminance.

In an exemplary embodiment, the optical imaging lens assembly according to the disclosure may satisfy $0.3<DT12/DT61<0.8$, wherein DT12 is a maximum effective radius of an image-side surface of the first lens, and DT61 is a maximum effective radius of an object-side surface of the sixth lens. More specifically, DT12 and DT61 may further satisfy $0.4<DT12/DT61<0.6$. Satisfying $0.3<DT12/DT61<0.8$ is favorable for making the optical imaging lens assembly relatively small in overall size and relatively small in Total Track Length (TTL) and also favorable for achieving relatively high imaging performance of the optical imaging lens assembly.

In an exemplary embodiment, the optical imaging lens assembly according to the disclosure may satisfy $0.3<ImgH/TTL<0.8$, wherein TTL is a distance from the object-side surface of the first lens to an imaging surface of the optical imaging lens assembly on the optical axis, and ImgH is a half of a diagonal length of an effective pixel region on the imaging surface of the optical imaging lens assembly. More specifically, ImgH and TTL may further satisfy $0.4<ImgH/TTL<0.6$. Satisfying $0.3<ImgH/TTL<0.8$ is favorable for making the optical imaging lens assembly relatively small in overall size and relatively small in Total Track Length (TTL).

In an exemplary embodiment, the optical imaging lens assembly according to the disclosure may satisfy $-1.0<f/f1+f/f7<0$, wherein f is a total effective focal length of the optical imaging lens assembly, f1 is an effective focal length of the first lens, and f7 is an effective focal length of the seventh lens. More specifically, f, f1 and f7 may further satisfy $-1.0<f/f1+f/f7<-0.6$. Satisfying $-1.0<f/f1+f/f7<0$ is favorable for correcting a chromatic aberration and monochromatic aberration of the system to balance various aberrations.

In an exemplary embodiment, the optical imaging lens assembly according to the disclosure may satisfy $0<f2/(R3-R4)<1.0$, wherein f2 is an effective focal length of the second lens, R3 is a curvature radius of an object-side surface of the second lens, and R4 is a curvature radius of an image-side surface of the second lens. More specifically, f2, R3 and R4 may further satisfy $0.3<f2/(R3-R4)<0.5$. $0<f2/(R3-R4)<1.0$ is satisfied, so that a spherical aberration of the system may be corrected effectively, and an imaging resolution may be improved.

In an exemplary embodiment, the optical imaging lens assembly according to the disclosure may satisfy $0.5<f/f45<1.5$, wherein f is the total effective focal length of the optical imaging lens assembly, and f45 is a combined focal length of the fourth lens and the fifth lens. More specifically, f and f45 may further satisfy $0.9<f/f45<1.4$. Satisfying $0.5<f/f45<1.5$ is favorable for correcting an axial aberration of the system.

In an exemplary embodiment, the optical imaging lens assembly according to the disclosure may satisfy $-2.0<f67/f23<-0.5$, wherein f23 is a combined focal length of the first lens and the second lens, and f67 is a combined focal length of the sixth lens and the seventh lens. More specifically, f67 and f23 may further satisfy $-2.0<f67/f23<-0.6$. Satisfying $-2.0<f67/f23<-0.5$ is favorable for correcting a chromatic lateral aberration of the system well, improving the imaging quality of a large field of view range and reducing a purple fringe risk.

In an exemplary embodiment, the optical imaging lens assembly according to the disclosure may satisfy $0<(R1-R2)/(R1+R2)<1.0$, wherein R1 is a curvature radius of the object-side surface of the first lens, and R2 is a curvature radius of the image-side surface of the first lens. More specifically, R1 and R2 may further satisfy $0.8<(R1-R2)/(R1+R2)<1.0$. Satisfying $0<(R1-R2)/(R1+R2)<1.0$ is favorable for correcting the spherical aberration of the system better.

In an exemplary embodiment, the optical imaging lens assembly according to the disclosure may satisfy $0.5<R6/R5<1.5$, wherein R5 is a curvature radius of an object-side surface of the third lens, and R6 is a curvature radius of an image-side surface of the third lens. More specifically, R5 and R6 may further satisfy $0.6<R6/R5<1.2$. Satisfying $0.5<R6/R5<1.5$ is favorable for correcting the coma of the system better and improving the imaging quality in an off-axis field of view.

In an exemplary embodiment, the optical imaging lens assembly according to the disclosure may satisfy $0.5<|R7/f4+R12/f6|<1.5$, wherein f4 is an effective focal length of the fourth lens, f6 is an effective focal length of the sixth lens, R7 is a curvature radius of an object-side surface of the fourth lens, and R12 is a curvature radius of an image-side surface of the sixth lens. More specifically, R7, f4, R12 and f6 may further satisfy $0.8<|R7/f4+R12/f6|<1.4$. $0.5<|R7/f4+R12/f6|<1.5$ is satisfied, so that an astigmatic aberration may be corrected well to make uniform the image quality in different directions.

In an exemplary embodiment, the optical imaging lens assembly according to the disclosure may satisfy $0.5<TD/SL<1.0$, wherein TD is a distance from the object-side surface of the first lens to an image-side surface of the seventh lens on the optical axis, and SL is a distance from a diaphragm to the imaging surface of the optical imaging lens assembly on the optical axis. More specifically, TD and SL may further satisfy 0.8<TD/SL<1.0. Satisfying 0.5<TD/SL<1.0 is favorable for configuring the refractive power of each lens reasonably and further balancing and correcting an on-axis spherical aberration and off-axis field curvature of the system.

In an exemplary embodiment, the optical imaging lens assembly according to the disclosure may satisfy 0.3<CT6/ET6<0.8, wherein CT6 is a center thickness of the sixth lens on the optical axis, and ET6 is an edge thickness of the sixth lens. More specifically, CT6 and ET6 may further satisfy 0.4<CT6/ET6<0.7. Satisfying 0.3<CT6/ET6<0.8 is favorable for correcting an off-axis field curvature aberration of the system to make more balanced the image quality in central and marginal FOVs.

In an exemplary embodiment, the optical imaging lens assembly according to the disclosure may satisfy −1.0<(R13+R14)/R10<0, wherein R10 is a curvature radius of an image-side surface of the fifth lens, R13 is a curvature radius of an object-side surface of the seventh lens, and R14 is a curvature radius of the image-side surface of the seventh lens. More specifically, R13, R14 and R10 may further satisfy −1.0<(R13+R14)/R10<−0.2. Satisfying-1.0<(R13+R14)/R10<0 is favorable for configuring refractive power of the object-side surfaces and image-side surfaces of the fifth lens and the seventh lens reasonably and correcting a field curvature in the off-axis FOV.

In an exemplary embodiment, the optical imaging lens assembly according to the disclosure may satisfy 0.5<ET3/ET2<1.0, wherein ET2 is an edge thickness of the second lens, and ET3 is an edge thickness of the third lens. More specifically, ET3 and ET2 may further satisfy 0.7<ET3/ET2<1.0. Satisfying 0.5<ET3/ET2<1.0 is favorable for correcting the chromatic lateral aberration of the system.

In an exemplary embodiment, the optical imaging lens assembly according to the disclosure may satisfy 0.5<ET4/ET5<1.5, wherein ET4 is an edge thickness of the fourth lens, and ET5 is an edge thickness of the fifth lens. More specifically, ET4 and ET5 may further satisfy 0.7<ET4/ET5<1.3. Satisfying 0.5<ET4/ET5<1.5 is favorable for correcting the chromatic lateral aberration of the system.

In an exemplary embodiment, the optical imaging lens assembly according to the disclosure may satisfy 0.3<SAG42/(SAG42+SAG51)<0.8, wherein SAG42 is a distance from an intersection point of an image-side surface of the fourth lens and the optical axis to an effective radius vertex of the image-side surface of the fourth lens on the optical axis, and SAG51 is a distance from an intersection point of an object-side surface of the fifth lens and the optical axis to an effective radius vertex of the object-side surface of the fifth lens on the optical axis. More specifically, SAG42 and SAG51 may further satisfy 0.4<SAG42/(SAG42+SAG51)<0.7. Satisfying 0.3<SAG42/(SAG42+SAG51)<0.8 is favorable for correcting the astigmatic aberration of the system to ensure that the image quality in different directions is balanced.

In an exemplary embodiment, the optical imaging lens assembly according to the disclosure may satisfy 0.5<(CT1+CT2)/(CT4+CT5)<1.0, wherein CT1 is a center thickness of the first lens on the optical axis, CT2 is a center thickness of the second lens on the optical axis, CT4 is a center thickness of the fourth lens on the optical axis, and CT5 is a center thickness of the fifth lens on the optical axis. More specifically, CT1, CT2, CT4 and CT5 may further satisfy 0.7<(CT1+CT2)/(CT4+CT5)<1.0. Satisfying 0.5<(CT1+CT2)/(CT4+CT5)<1.0 is favorable for correcting each aberration of the system well and simultaneously making the system compact and relatively small in Total Track Length (TTL).

In an exemplary embodiment, the optical imaging lens assembly according to the disclosure may satisfy 0.3<T12/ΣAT<0.8, wherein T12 is a spacing distance of the first lens and the second lens on the optical axis, and ΣAT is a sum of spacing distances of any two adjacent lenses in the first lens to the seventh lens on the optical axis. More specifically, T12 and ΣAT may further satisfy 0.3<T12/ΣAT<0.6. Satisfying 0.3<T12/ΣAT<0.8 is favorable for achieving a relatively high relative illumination of the system.

In an exemplary embodiment, the first lens may have a negative refractive power, and the image-side surface thereof may be a concave surface. Such refractive power and surface type design of the first lens are favorable for balancing or reducing the spherical aberration and coma of the lens and simultaneously reducing a ghost image risk of the lens.

In an exemplary embodiment, the second lens may have a positive refractive power, the object-side surface thereof may be a convex surface, while the image-side surface may be a convex surface. Such refractive power and surface type design of the second lens are favorable for balancing or reducing the spherical aberration and coma of the lens and simultaneously reducing the ghost image risk of the lens.

In an exemplary embodiment, the image-side surface of the fifth lens may be a convex surface. Such refractive power and surface type design of the fifth lens are favorable for balancing or reducing the spherical aberration and coma of the lens and simultaneously reducing the ghost image risk of the lens.

In an exemplary embodiment, the image-side surface of the sixth lens may be a concave surface. Such refractive power and surface type design of the sixth lens are favorable for balancing or reducing the spherical aberration and coma of the lens and simultaneously reducing the ghost image risk of the lens.

In an exemplary embodiment, the object-side surface of the seventh lens may be a convex surface, while the image-side surface may be a concave surface. Such refractive power and surface type design of the seventh lens are favorable for balancing or reducing the spherical aberration and coma of the lens and simultaneously reducing the ghost image risk of the lens.

In an exemplary embodiment, the optical imaging lens assembly according to the disclosure further includes the diaphragm arranged between the first lens and the second lens. Optionally, the optical imaging lens assembly may further include an optical filter configured to correct a chromatic aberration and/or protective glass configured to protect a photosensitive element on the imaging surface. The disclosure provides an optical imaging lens assembly with the characteristics of small size, wide angle, high imaging quality and the like. The optical imaging lens assembly according to the implementation mode of the disclosure may adopt multiple lenses, for example, the abovementioned seven. The refractive power and surface types of each lens, the center thickness of each lens, on-axis distances between the lenses and the like may be reasonably configured to effectively converge incident light, reduce an optical total length of the imaging lens, improve the machinability of the imaging lens and ensure that the optical imaging lens assembly is more favorable for production and machining.

In the implementation mode of the disclosure, at least one of mirror surfaces of each lens is an aspheric mirror surface, namely at least one mirror surface in the object-side surface of the first lens to an image-side surface of the seventh lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspheric mirror surface. Optionally, both the object-side surface and image-side surface of each lens in the first lens, the second lens, the third lens, the fourth lens, the fifth lens, the sixth lens and the seventh lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with seven lenses as an example, the optical imaging lens assembly is not limited to seven lenses. If necessary, the optical imaging lens assembly may further include another number of lenses.

Specific embodiments applied to the optical imaging lens assembly of the abovementioned implementation mode will further be described below with reference to the drawings.

Embodiment 1

An optical imaging lens assembly according to Embodiment 1 of the disclosure will be described below with reference to FIGS. 1-2D. FIG. 1 is a structure diagram of an optical imaging lens assembly according to Embodiment 1 of the disclosure.

As shown in FIG. 1, the optical imaging lens assembly sequentially includes, from an object side to an image side, a first lens E1, a diaphragm STO, a second lens E2, a third lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 1 shows a table of basic parameters for the optical imaging lens assembly of Embodiment 1, and units of the curvature radius, the thickness/distance, and the focal length are all millimeter (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | 100.0000 | 0.2800 | 1.78 | 49.6 | −2.65 | 29.8481 |
| S2 | Aspheric | 2.0143 | 0.2621 | | | | −4.3602 |
| STO | Spherical | Infinite | −0.0018 | | | | |
| S3 | Aspheric | 4.0994 | 0.5505 | 1.59 | 61.2 | 3.50 | −0.7982 |
| S4 | Aspheric | −3.9761 | 0.0615 | | | | −43.5342 |
| S5 | Aspheric | 2.3012 | 0.2500 | 1.67 | 20.4 | −15.94 | 5.5357 |
| S6 | Aspheric | 1.8103 | 0.0532 | | | | −11.6388 |
| S7 | Aspheric | 1.7487 | 0.8443 | 1.55 | 56.1 | 1.52 | 2.0805 |
| S8 | Aspheric | −1.3194 | 0.03 | | | | −0.2323 |
| S9 | Aspheric | −2.3209 | 0.2500 | 1.67 | 20.4 | −32.47 | 4.0565 |
| S10 | Aspheric | −2.7108 | 0.0300 | | | | 1.1963 |
| S11 | Aspheric | 9.5113 | 0.2800 | 1.65 | 23.5 | −19.12 | −2.3012 |
| S12 | Aspheric | 5.3148 | 0.0347 | | | | −29.4346 |
| S13 | Aspheric | 0.6707 | 0.3011 | 1.54 | 55.9 | −7.78 | −0.8786 |
| S14 | Aspheric | 0.4872 | 0.5191 | | | | −2.5526 |
| S15 | Spherical | Infinite | 0.2100 | 1.52 | 64.2 | | |
| S16 | Spherical | Infinite | 0.3000 | | | | |
| S17 | Spherical | Infinite | | | | | |

In the example, a total effective focal length f of the optical imaging lens assembly is 1.71 mm, a TTL of the optical imaging lens assembly (i.e., a distance from the object-side surface S1 of the first lens E1 to the imaging surface S17 of the optical imaging lens assembly on an optical axis) is 4.25 mm, ImgH is a half of a diagonal length of an effective pixel region on the imaging surface of the optical imaging lens assembly, and a value of ImgH is 1.91 mm, a maximum field of view (FOV) of the optical imaging lens assembly is 112.1°, and a ratio f/EPD of the total effective focal length f of the optical imaging lens assembly to an entrance pupil diameter (EPD) of the optical imaging lens assembly is 2.08.

In Embodiment 1, both the object-side surface and image-side surface of any lens in the first lens E1 to the seventh lens E7 are aspheric surfaces, and a surface type x of each aspheric lens may be defined through, but not limited to, the following aspheric surface formula:

$$x = \frac{ch^2}{1 + \sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients A4, A6, A8, A10, A12, A14 and A16 applied to the aspheric mirror surfaces S1-S14 in Embodiment 1.

TABLE 2

| Surface number | A4 | A6 | A8 | A10 | A12 | A14 | A16 |
|---|---|---|---|---|---|---|---|
| S1 | 6.5969E−01 | −1.0002E+00 | 1.3723E+00 | −1.2692E+00 | 5.0543E−01 | 0.0000E+00 | 0.0000E+00 |
| S2 | 1.3073E+00 | −9.1780E−01 | 3.5807E+00 | −4.2268E+00 | 1.0961E+01 | 0.0000E+00 | 0.0000E+00 |
| S3 | 2.3775E−01 | −5.6415E−01 | 0.0000E+00 | 0.0000E+00 | 0.0000E+00 | 0.0000E+00 | 0.0000E+00 |
| S4 | −7.8742E−01 | 0.0000E+00 | 0.0000E+00 | 0.0000E+00 | 0.0000E+00 | 0.0000E+00 | 0.0000E+00 |
| S5 | −6.5545E−01 | −3.1712E−01 | −1.4997E+00 | 6.2540E+00 | −7.9305E+00 | 4.6976E+00 | 0.0000E+00 |
| S6 | −1.2962E−01 | −2.7596E−01 | −1.1207E−01 | 5.8726E−01 | −2.4798E−01 | 0.0000E+00 | 0.0000E+00 |
| S7 | −4.2531E−01 | 9.6382E−01 | −2.1936E+00 | 4.0935E+00 | −1.1861E+00 | 5.6124E+00 | −2.1606E+00 |
| S8 | −1.5093E+00 | 9.1005E+00 | −3.0209E+01 | 6.1358E+01 | −7.2182E+01 | 4.4836E+01 | −1.1288E+01 |
| S9 | −1.4214E+00 | 9.6181E+00 | −3.1351E+01 | 6.0189E+01 | −6.6848E+01 | 3.9605E+01 | −9.7218E+00 |
| S10 | −7.7090E−02 | 1.6661E+00 | −6.2826E+00 | 1.0601E+01 | −8.7421E+00 | 3.4651E+00 | −5.2846E−01 |
| S11 | 1.1774E+00 | −3.4181E+00 | 4.7606E+00 | −6.0129E+00 | 5.8183E+00 | −2.9947E+00 | 5.9202E−01 |
| S12 | 1.5515E+00 | −4.2232E+00 | 5.7189E+00 | −4.5842E+00 | 2.1763E+00 | −5.6194E−01 | 6.0340E−02 |
| S13 | −9.9206E−01 | −1.0546E+00 | 1.7336E+00 | −2.1626E+00 | 1.2565E+00 | −3.6155E−01 | 4.1315E−02 |
| S14 | −5.5695E−01 | 5.2914E−01 | −3.1692E−01 | 1.1452E−01 | −2.2670E−02 | 1.8805E−03 | 0.0000E+00 |

Figure 2A:
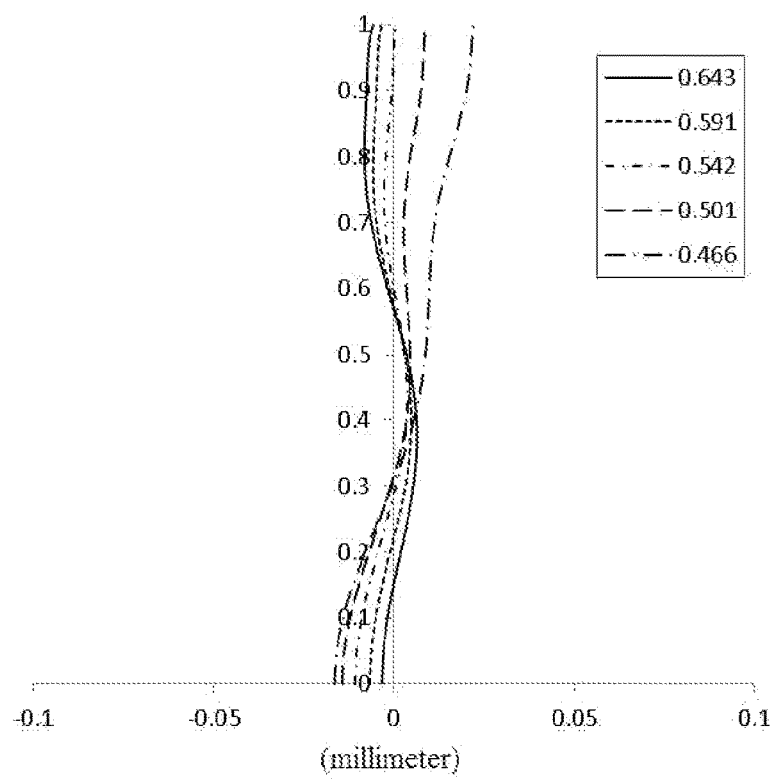
FIGS. 2A-2D show a longitudinal aberration curve, an astigmatism curve, a distortion curve and a lateral color curve of an optical imaging lens assembly according to Embodiment 1 respectively.
Figure 2B:
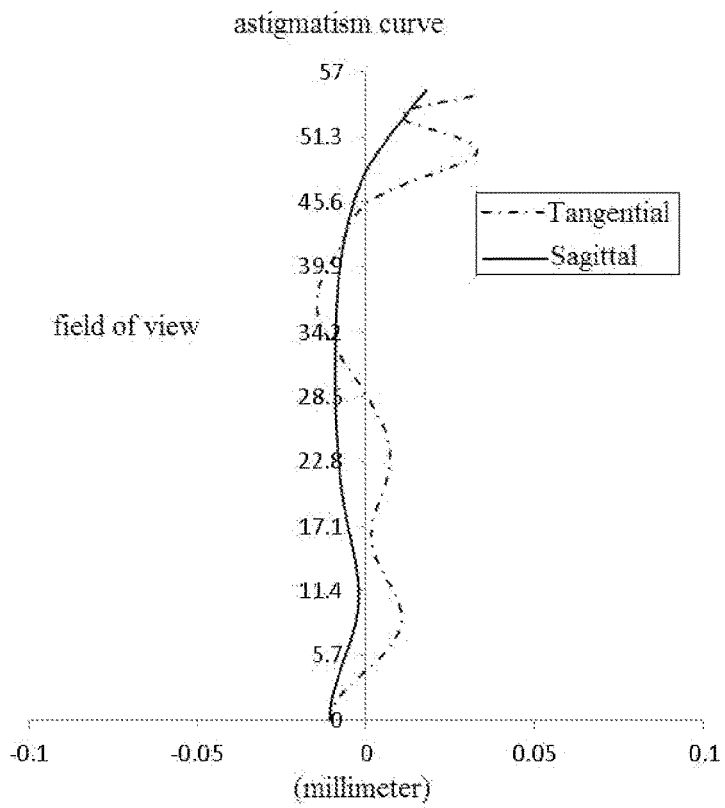
Figure 2C:
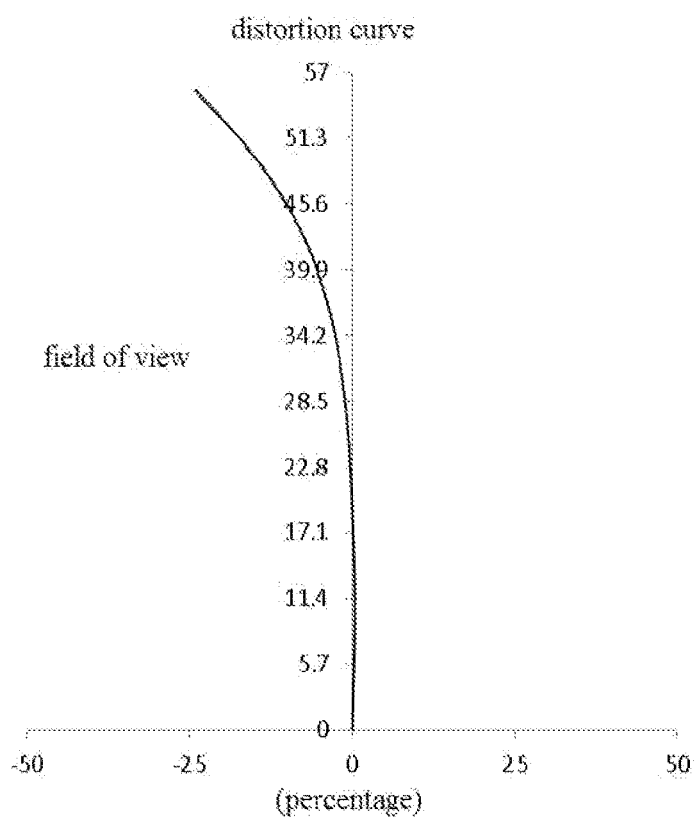
Figure 2D:
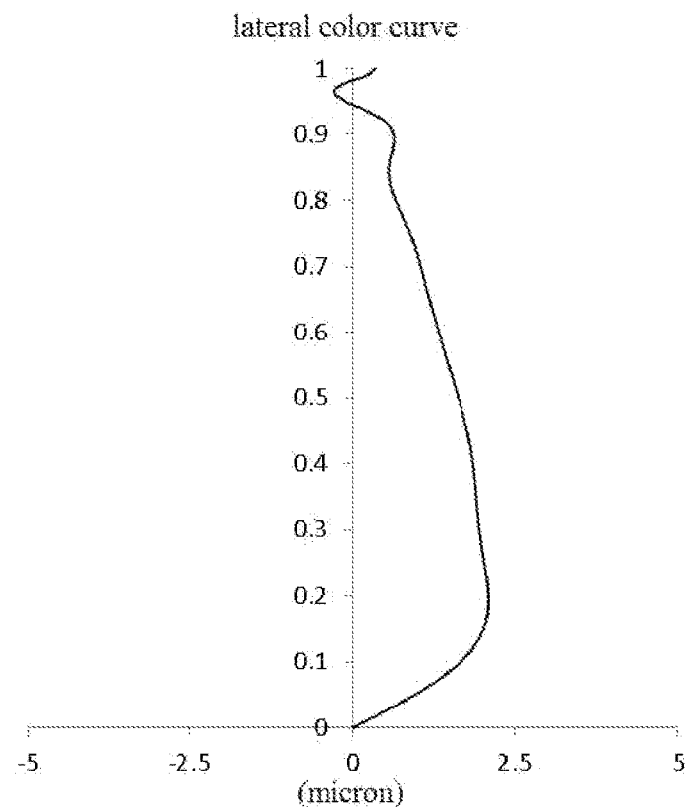

FIG. 2A shows a longitudinal aberration curve of the optical imaging lens assembly according to Embodiment 1 to represent deviation of a convergence focal point after light with different wavelengths passes through the lens. FIG. 2B shows an astigmatism curve of the optical imaging lens assembly according to Embodiment 1 to represent a tangential image surface curvature and a sagittal image surface curvature. FIG. 2C shows a distortion curve of the optical imaging lens assembly according to Embodiment 1 to represent distortion values corresponding to different fields of view. FIG. 2D shows a lateral color curve of the optical imaging lens assembly according to Embodiment 1 to represent deviation of different image heights on the imaging surface after the light passes through the lens. According to FIGS. 2A-2D, it can be seen that the optical imaging lens assembly provided in Embodiment 1 may achieve high imaging quality.

Embodiment 2

Figure 3:
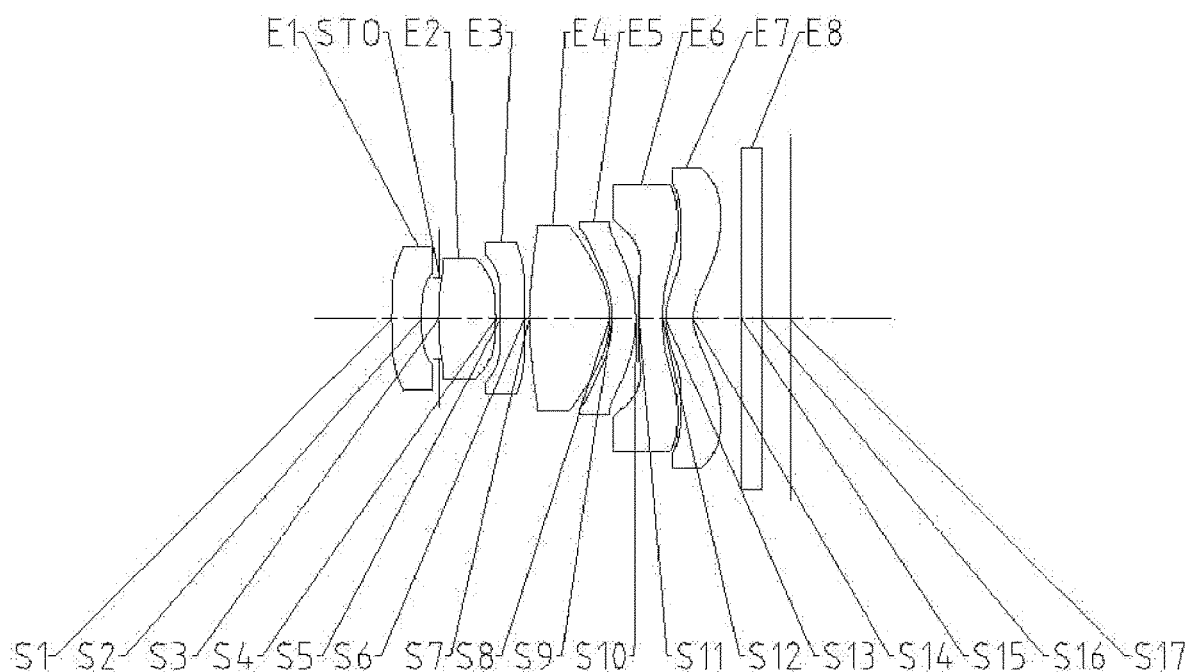
FIG. 3 shows a structure diagram of an optical imaging lens assembly according to Embodiment 2 of the disclosure.

An optical imaging lens assembly according to Embodiment 2 of the disclosure will be described below with reference to FIGS. 3-4D. In the present embodiment and the following embodiments, part of descriptions similar to Embodiment 1 will be omitted for simplicity. FIG. 3 is a structure diagram of an optical imaging lens assembly according to Embodiment 2 of the disclosure.

As shown in FIG. 3, the optical imaging lens assembly sequentially includes, from an object side to an image side, a first lens E1, a diaphragm STO, a second lens E2, a third lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the optical imaging lens assembly is 1.68 mm, a TTL of the optical imaging lens assembly (i.e., a distance from the object-side surface S1 of the first lens E1 to the imaging surface S17 of the optical imaging lens assembly on an optical axis) is 4.19 mm, ImgH is a half of a diagonal length of an effective pixel region on the imaging surface of the optical imaging lens assembly, and a value of ImgH is 1.92 mm, a maximum field of view (FOV) of the optical imaging lens assembly is 112.1°, and a ratio f/EPD of the total effective focal length f of the optical imaging lens assembly to an entrance pupil diameter (EPD) of the optical imaging lens assembly is 2.08.

Table 3 shows a table of basic parameters for the optical imaging lens assembly of Embodiment 2, and units of the curvature radius, the thickness/distance, and the focal length are all millimeter mm. Table 4 shows high-order coefficients applied to each aspheric mirror surface in Embodiment 2. A surface type of each aspheric surface may be defined by the formula (1) given in Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | 50.0000 | 0.3050 | 1.78 | 49.6 | −2.90 | 29.8481 |
| S2 | Aspheric | 2.1502 | 0.1976 | | | | 0.0000 |
| STO | Spherical | Infinite | −0.0138 | | | | |
| S3 | Aspheric | 3.1092 | 0.5991 | 1.55 | 56.1 | 3.27 | 15.8091 |
| S4 | Aspheric | −3.9116 | 0.0508 | | | | 8.3084 |
| S5 | Aspheric | 8.0682 | 0.2500 | 1.67 | 20.4 | −30.47 | 0.5518 |
| S6 | Aspheric | 5.7023 | 0.0500 | | | | −15.5436 |
| S7 | Aspheric | 2.9624 | 0.8501 | 1.67 | 55.4 | 1.28 | 6.8476 |
| S8 | Aspheric | −1.0744 | 0.0300 | | | | −0.6165 |
| S9 | Aspheric | −1.3052 | 0.2500 | 1.67 | 20.4 | 42.21 | 0.3762 |
| S10 | Aspheric | −1.3428 | 0.0300 | | | | −0.3012 |
| S11 | Aspheric | −6.1924 | 0.2500 | 1.67 | 20.4 | −4.01 | 0.0000 |
| S12 | Aspheric | 4.7831 | 0.0318 | | | | −19.4967 |
| S13 | Aspheric | 0.7251 | 0.2900 | 1.54 | 55.9 | −7.04 | −0.9530 |
| S14 | Aspheric | 0.5234 | 0.5084 | | | | −1.6311 |
| S15 | Spherical | Infinite | 0.2100 | 1.52 | 64.2 | | |
| S16 | Spherical | Infinite | 0.3000 | | | | |
| S17 | Spherical | Infinite | | | | | |

TABLE 4

| Surface number | A4 | A6 | A8 | A10 | A12 | A14 | A16 |
|---|---|---|---|---|---|---|---|
| S1 | 6.2383E−01 | −9.5529E−01 | 1.5241E+00 | −1.6288E+00 | 7.9303E−01 | 0.0000E+00 | 0.0000E+00 |
| S2 | 1.2998E+00 | −1.4966E+00 | 8.0049E+00 | −1.4764E+01 | 2.1373E+01 | 0.0000E+00 | 0.0000E+00 |
| S3 | 2.5988E−01 | −5.8269E−01 | −1.9409E+00 | 3.9580E+00 | 0.0000E+00 | 0.0000E+00 | 0.0000E+00 |
| S4 | −1.1190E+00 | 1.3706E+00 | −6.7664E+00 | 1.2362E+01 | −6.3627E+00 | 0.0000E+00 | 0.0000E+00 |
| S5 | −1.0084E+00 | 7.7860E−01 | −2.1320E+00 | −7.4121E+00 | 3.4400E+01 | −2.8431E+01 | 0.0000E+00 |
| S6 | −4.9670E−01 | 3.0424E−01 | −1.1227E−01 | −1.8546E−01 | 4.6664E−01 | 0.0000E+00 | 0.0000E+00 |
| S7 | −2.4631E−01 | 1.4260E−01 | 2.5112E−01 | −3.7874E−01 | −6.6708E−02 | 1.5041E−01 | 0.0000E+00 |
| S8 | −2.0004E−01 | 3.8296E−01 | 9.8488E−01 | −3.0293E+00 | 3.5411E+00 | −2.3690E+00 | 7.4579E−01 |
| S9 | −5.1626E−01 | 1.4540E+00 | 7.8669E−01 | −5.7421E+00 | 8.1463E+00 | −5.5246E+00 | 1.5240E+00 |
| S10 | −7.8867E−02 | 1.0124E+00 | −3.1818E+00 | 6.2033E+00 | −6.9196E+00 | 4.0203E+00 | −9.2348E−01 |
| S11 | 9.9401E−01 | −2.2402E+00 | 5.4278E−01 | 3.1853E+00 | −5.7806E+00 | 4.3671E+00 | −1.2133E+00 |
| S12 | 1.3133E+00 | −3.8500E+00 | 5.2951E+00 | −4.2156E+00 | 1.9754E+00 | −5.0431E−01 | 5.3760E−02 |
| S13 | −6.5970E−01 | −1.4255E+00 | 4.0609E+00 | −4.2670E+00 | 2.3152E+00 | −64656E−01 | 7.3563E−02 |
| S14 | −9.8023E−01 | 1.0506E+00 | −6.7079E−01 | 2.6285E−01 | −6.0535E−02 | 6.2029E−03 | 0.0000E+00 |

Figure 4A:
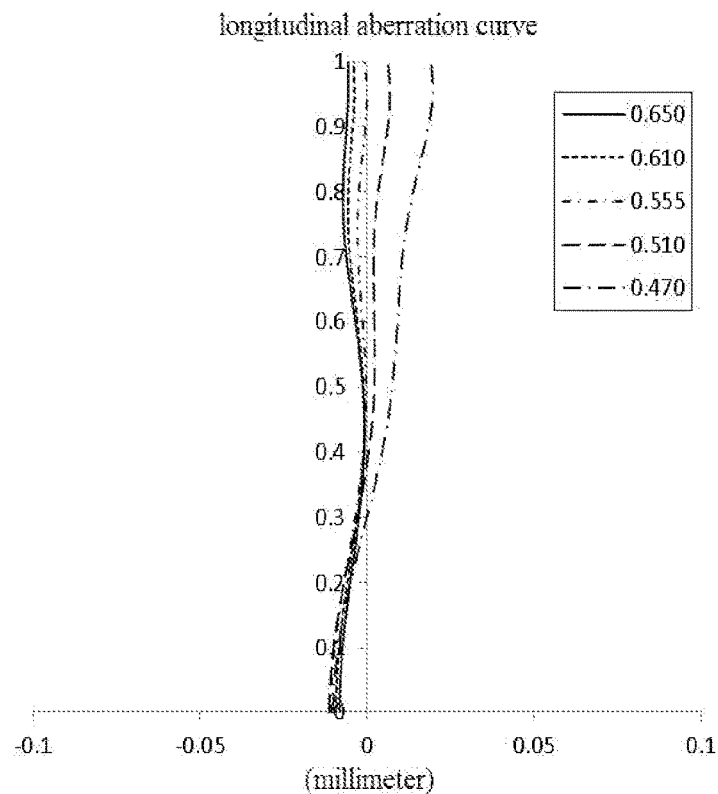
FIGS. 4A-4D show a longitudinal aberration curve, an astigmatism curve, a distortion curve and a lateral color curve of an optical imaging lens assembly according to Embodiment 2 respectively.
Figure 4B:
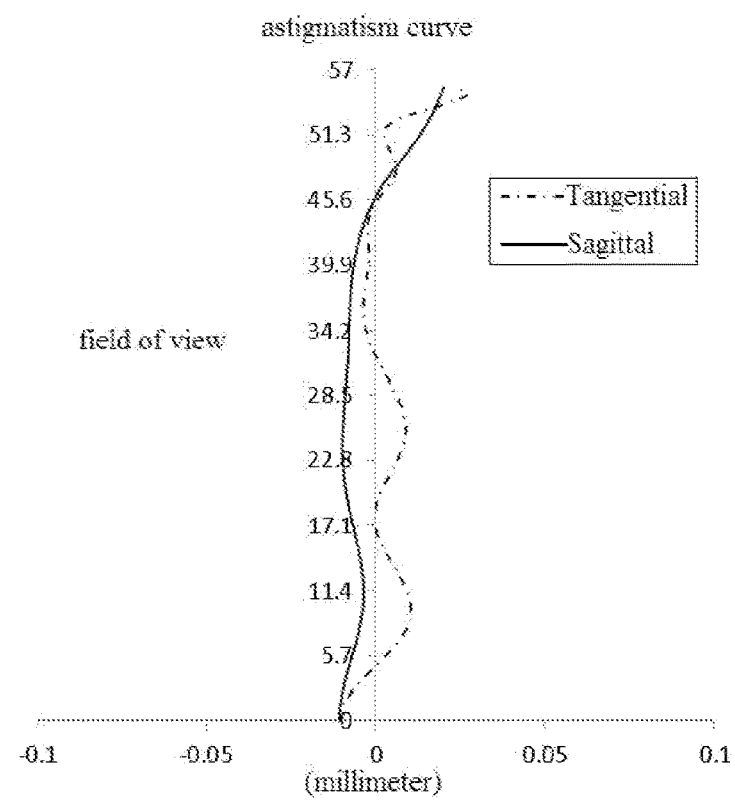
Figure 4C:
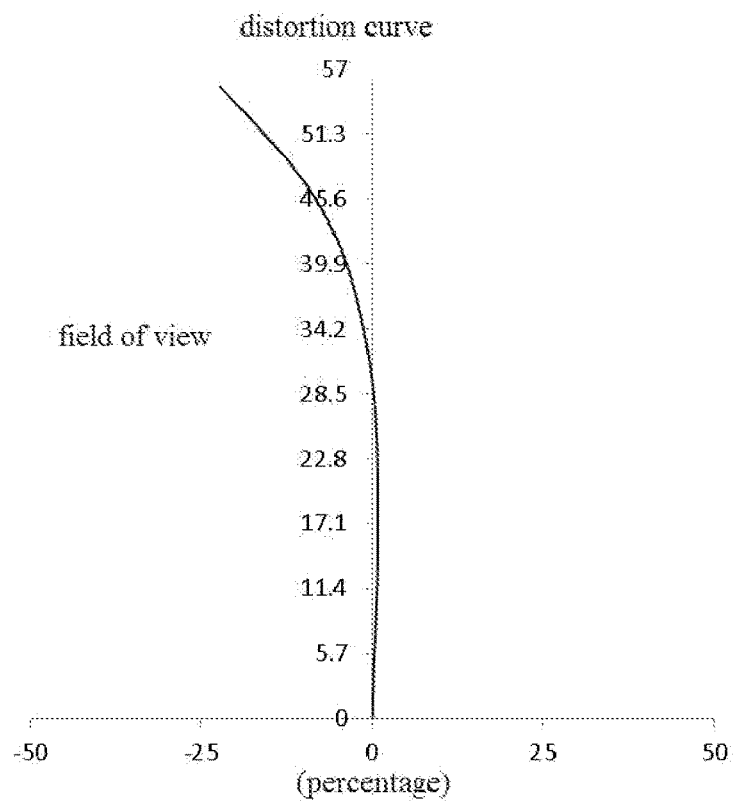
Figure 4D:
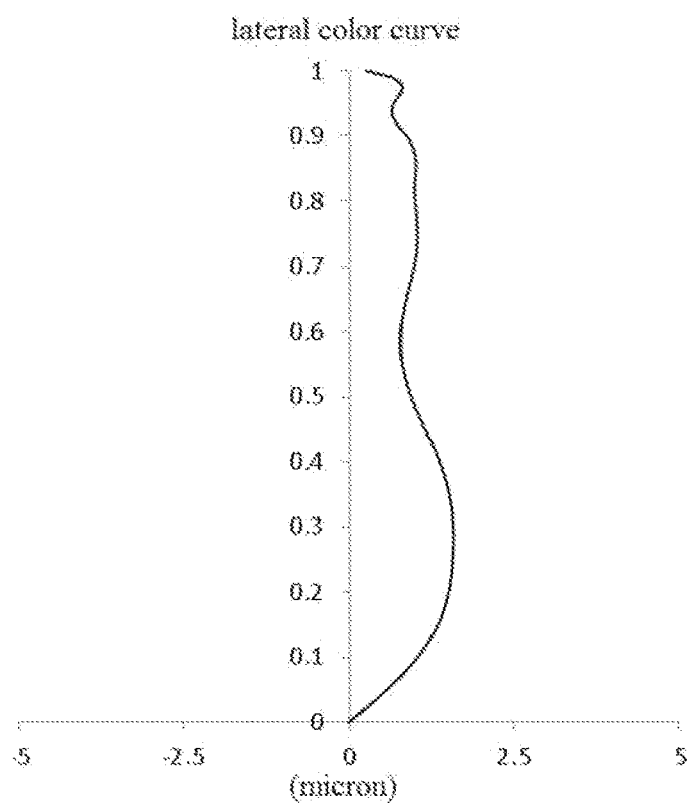

FIG. 4A shows a longitudinal aberration curve of the optical imaging lens assembly according to Embodiment 2 to represent deviation of a convergence focal point after light with different wavelengths passes through the lens. FIG. 4B shows an astigmatism curve of the optical imaging lens assembly according to Embodiment 2 to represent a tangential image surface curvature and a sagittal image surface curvature. FIG. 4C shows a distortion curve of the optical imaging lens assembly according to Embodiment 2 to represent distortion values corresponding to different fields of view. FIG. 4D shows a lateral color curve of the optical imaging lens assembly according to Embodiment 2 to represent deviation of different image heights on the imaging surface after the light passes through the lens. According to FIGS. 4A-4D, it can be seen that the optical imaging lens assembly provided in Embodiment 2 may achieve high imaging quality.

Embodiment 3

Figure 5:
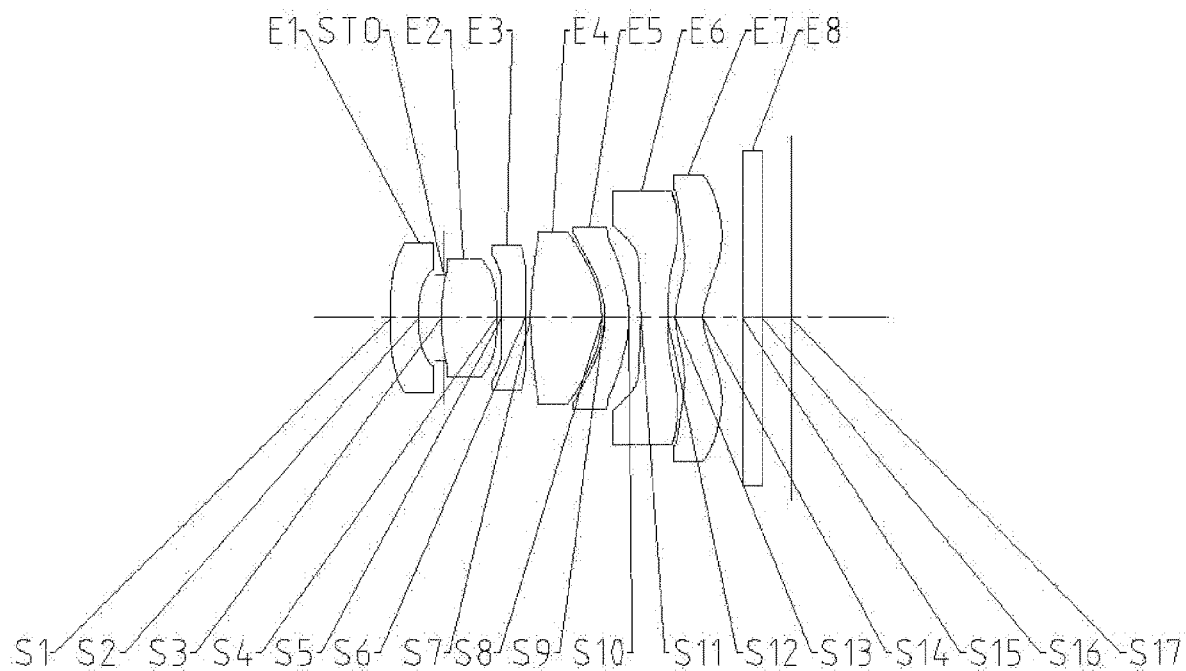
FIG. 5 shows a structure diagram of an optical imaging lens assembly according to Embodiment 3 of the disclosure.

An optical imaging lens assembly according to Embodiment 3 of the disclosure is described below with reference to FIGS. 5-6D. FIG. 5 is a structure diagram of an optical imaging lens assembly according to Embodiment 3 of the disclosure.

As shown in FIG. 5, the optical imaging lens assembly sequentially includes, from an lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the optical imaging lens assembly is 1.72 mm, a TTL of the optical imaging lens assembly (i.e., a distance from the object-side surface S1 of the first lens E1 to the imaging surface S17 of the optical imaging lens assembly on an optical axis) is 4.22 mm, ImgH is a half of a diagonal length of an effective pixel region on the imaging surface of the optical imaging lens assembly, and a value of ImgH is 1.93 mm, a maximum field of view (FOV) of the optical imaging lens assembly is 112.1°, and a ratio f/EPD of the total effective focal length f of the optical imaging lens assembly to an entrance pupil diameter (EPD) of the optical imaging lens assembly is 2.08.

Table 5 shows a table of basic parameters for the optical imaging lens assembly of Embodiment 3, and units of the curvature radius, the thickness/distance, and the focal length are all mm. Table 6 shows high-order coefficients applied to each aspheric mirror surface in Embodiment 3. A surface type of each aspheric surface may be defined by the formula (1) given in Embodiment 1.

Figure 6A:
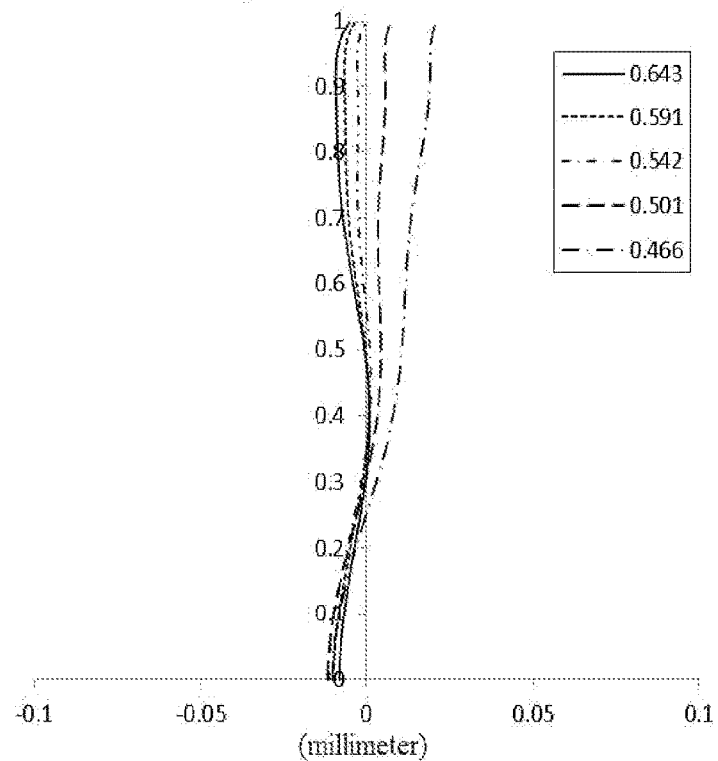
FIGS. 6A-6D show a longitudinal aberration curve, an astigmatism curve, a distortion curve and a lateral color curve of an optical imaging lens assembly according to Embodiment 3 respectively.
Figure 6B:
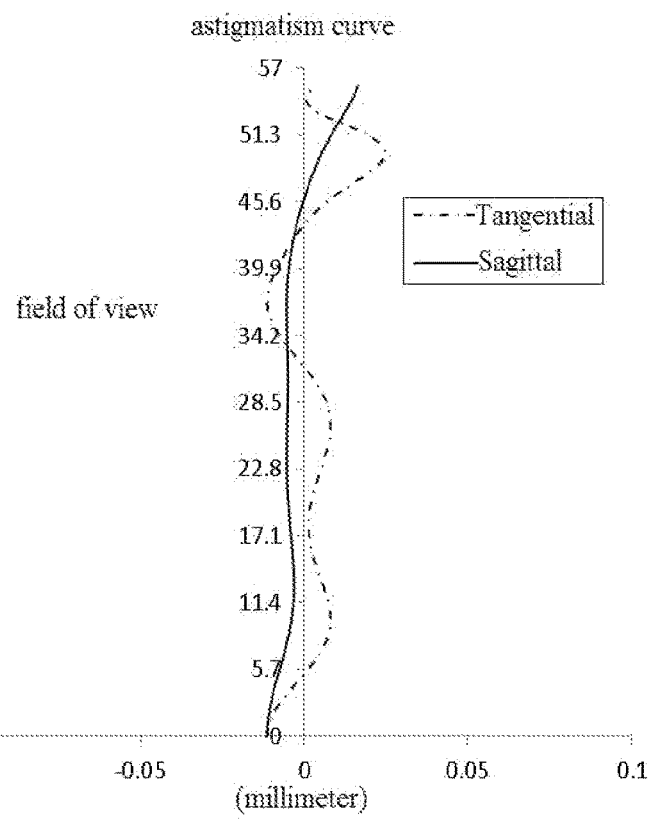
Figure 6C:
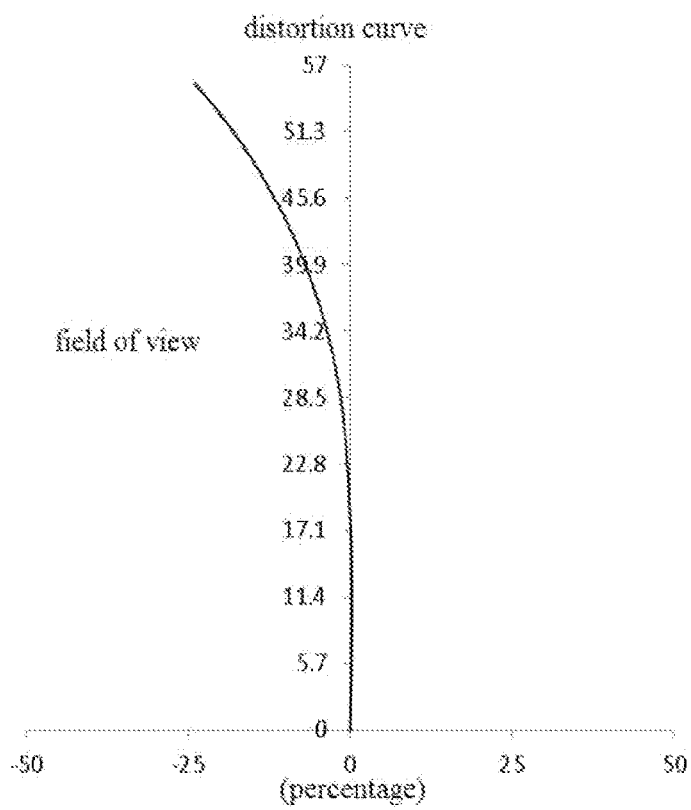
Figure 6D:
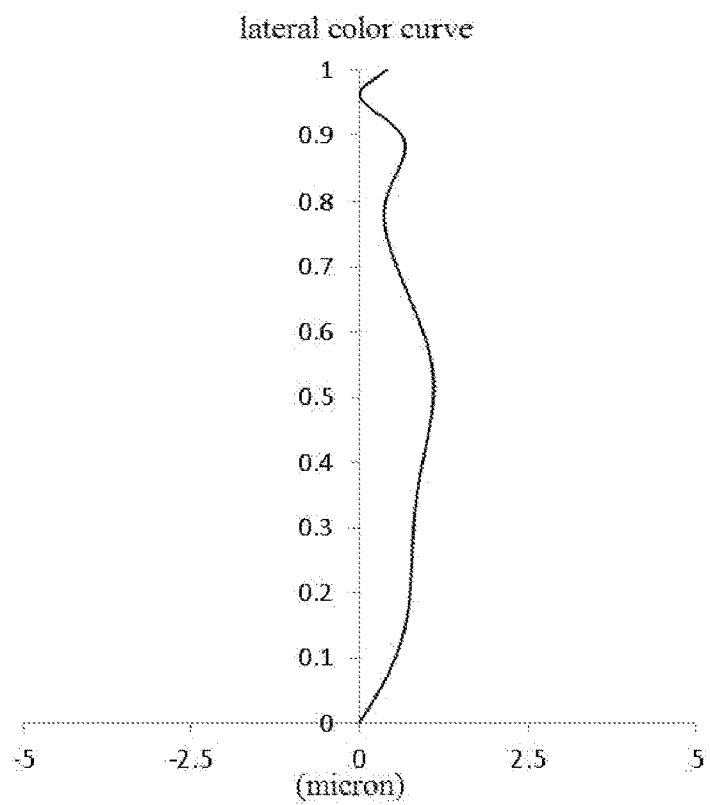

FIG. 6A shows a longitudinal aberration curve of the optical imaging lens assembly according to Embodiment 3 to represent deviation of a convergence focal point after light with different wavelengths passes through the lens. FIG. 6B shows an astigmatism curve of the optical imaging lens assembly according to Embodiment 3 to represent a tangential image surface curvature and a sagittal image surface curvature. FIG. 6C shows a distortion curve of the optical imaging lens assembly according to Embodiment 3 to represent distortion values corresponding to different fields of view. FIG. 6D shows a lateral color curve of the optical imaging lens assembly according to Embodiment 3 to represent deviation of different image heights on the imaging surface after the light passes through the lens. According to FIGS. 6A-6D, it can be seen that the optical imaging lens assembly provided in Embodiment 3 may achieve high imaging quality.

Embodiment 4

An optical imaging lens assembly according to Embodiment 4 of the disclosure is described below with reference

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | 50.0000 | 0.2875 | 1.78 | 49.6 | −2.44 | 29.8481 |
| S2 | Aspheric | 1.8241 | 0.2707 | | | | 0.0000 |
| STO | Spherical | Infinite | −0.0271 | | | | |
| S3 | Aspheric | 2.3842 | 0.5831 | 1.55 | 56.1 | 3.45 | 8.9300 |
| S4 | Aspheric | −8.2511 | 0.0512 | | | | −53.8359 |
| S5 | Aspheric | 3.3135 | 0.2500 | 1.67 | 20.4 | 35.08 | 0.5518 |
| S6 | Aspheric | 3.7414 | 0.0577 | | | | −15.5436 |
| S7 | Aspheric | 2.9593 | 0.7583 | 1.78 | 49.6 | 1.11 | 7.3055 |
| S8 | Aspheric | −1.0790 | 0.0326 | | | | −0.6720 |
| S9 | Aspheric | −1.1644 | 0.2500 | 1.67 | 20.4 | −8.66 | 0.2110 |
| S10 | Aspheric | −1.5827 | 0.1303 | | | | −0.0396 |
| S11 | Aspheric | −2.8165 | 0.2800 | 1.67 | 20.4 | −3.39 | 4.6004 |
| S12 | Aspheric | 12.0350 | 0.0804 | | | | −19.4967 |
| S13 | Aspheric | 0.8424 | 0.2900 | 1.54 | 55.9 | −7.25 | −0.9056 |
| S14 | Aspheric | 0.6094 | 0.4198 | | | | −2.7003 |
| S15 | Spherical | Infinite | 0.2100 | 1.52 | 64.2 | | |
| S16 | Spherical | Infinite | 0.3000 | | | | |
| S17 | Spherical | Infinite | | | | | |

TABLE 6

Figure 7:
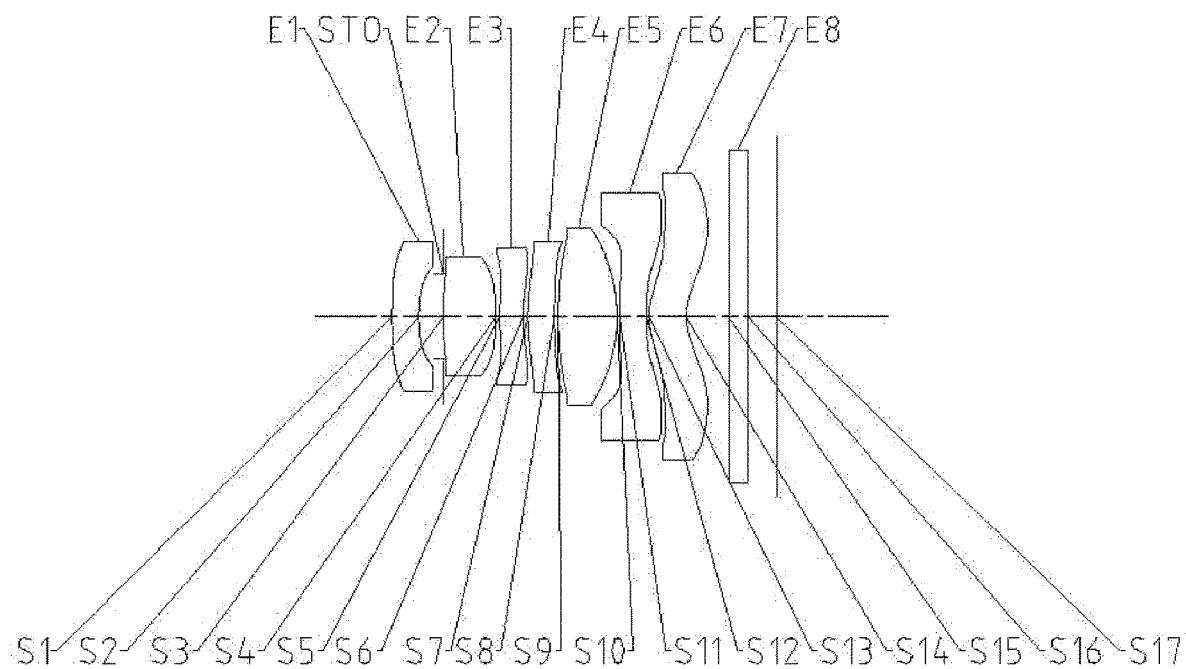
FIG. 7 shows a structure diagram of an optical imaging lens assembly according to Embodiment 4 of the disclosure.
Figure 8A:
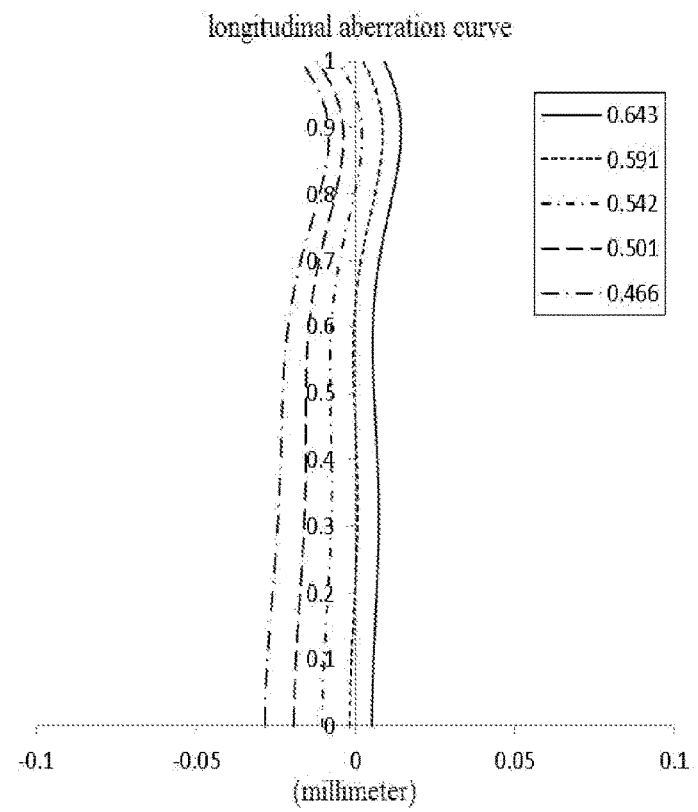
FIGS. 8A-8D show a longitudinal aberration curve, an astigmatism curve, a distortion curve and a lateral color curve of an optical imaging lens assembly according to Embodiment 4 respectively.
Figure 8B:
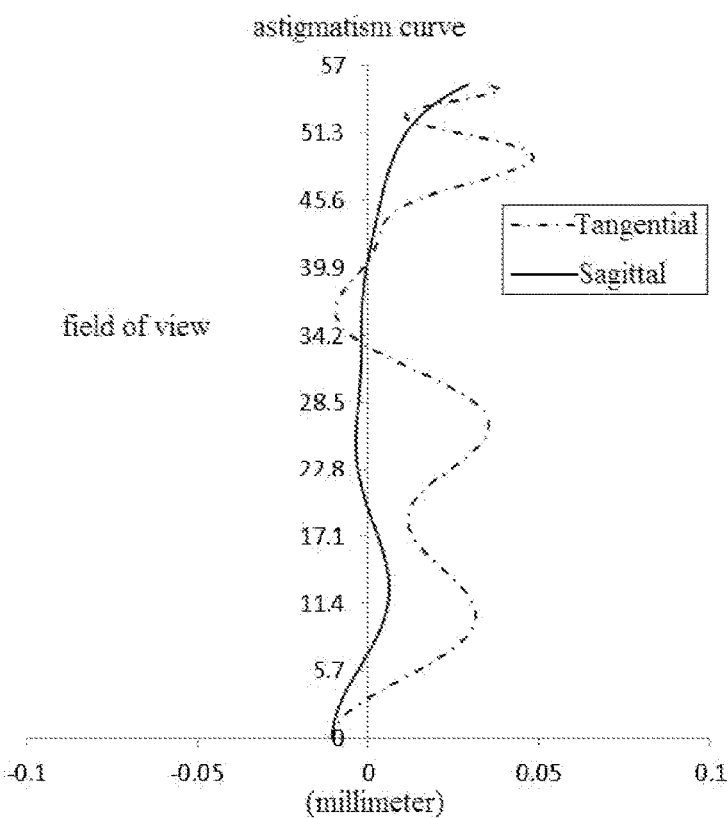
Figure 8C:
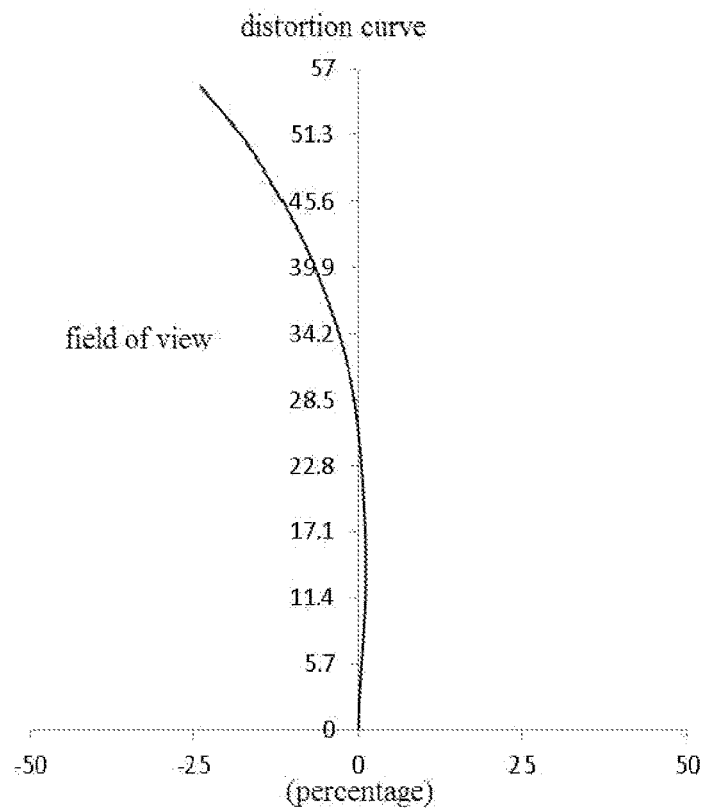
Figure 8D:
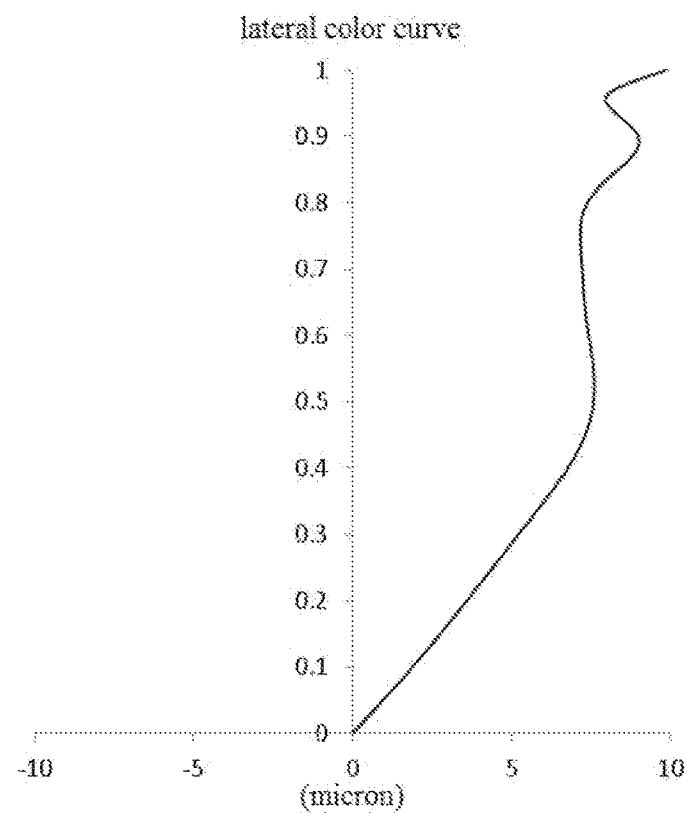

| Surface number | A4 | A6 | A8 | A10 | A12 | A14 | A16 |
|---|---|---|---|---|---|---|---|
| S1 | 6.3781E−01 | −9.8470E−01 | 1.4094E+00 | −1.2911E+00 | 5.3623E−01 | 0.0000E+00 | 0.0000E+00 |
| S2 | 1.2348E+00 | −1.0551E+00 | 5.7711E+00 | −1.4107E+01 | 3.4103E+01 | 0.0000E+00 | 0.0000E+00 |
| S3 | 1.5420E−01 | −4.7331E−01 | −7.6151E−01 | 1.3559E+00 | 0.0000E+00 | 0.0000E+00 | 0.0000E+00 |
| S4 | −1.0015E+00 | 2.6532E−01 | −1.0887E+00 | 1.7041E+00 | 8.3296E−01 | 0.0000E+00 | 0.0000E+00 |
| S5 | −84427E−01 | 5.9211E−02 | −1.5885E+00 | 3.0221E+00 | 2.2052E+00 | −2.3054E+00 | 0.0000E+00 |
| S6 | −4.3392E−01 | −4.9535E−02 | 7.5684E−01 | −8.5420E−01 | 5.2097E−01 | 0.0000E+00 | 0.0000E+00 |
| S7 | −2.5462E−01 | 5.8495E−02 | 9.9905E−01 | −2.3754E+00 | 2.2370E+00 | −8.7252E−01 | 0.0000E+00 |
| S8 | −4.9408E−01 | 3.4342E+00 | −9.7761E+00 | 1.4256E+01 | −8.8525E+00 | −6.5047E−02 | 1.5802E+00 |
| S9 | −1.2163E+00 | 8.2363E+00 | −2.3311E+01 | 3.5154E+01 | −2.6188E+01 | 7.2375E+00 | 2.7739E−01 |
| S10 | −6.6313E−01 | 4.9245E+00 | −1.4767E+01 | 2.4496E+01 | −2.3895E+01 | 1.3380E+01 | −3.3491E+00 |
| S11 | 6.2820E−01 | 3.7414E−02 | −6.1655E+00 | 1.6692E+01 | −2.4102E+01 | 1.8391E+01 | −5.5683E+00 |
| S12 | 8.7087E−01 | −2.1819E+00 | 2.6775E+00 | −2.0557E+00 | 9.8941E−01 | −2.6584E−01 | 2.9362E−02 |
| S13 | −1.1741E+00 | 6.8178E−01 | 3.3187E−01 | −7.3794E−01 | 4.6611E−01 | −1.3869E−01 | 1.6187E−02 |
| S14 | −7.1776E−01 | 8.8608E−01 | −7.9343E−01 | 4.5006E−01 | −1.3738E−01 | 1.6850E−02 | 0.0000E+00 | to FIGS. 7-8D. FIG. 7 is a structure diagram of an optical imaging lens assembly according to Embodiment 4 of the disclosure.

As shown in FIG. 7, the optical imaging lens assembly sequentially includes, from an lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the optical imaging lens assembly is 1.72 mm, a TTL of the optical imaging lens assembly (i.e., a distance from the object-side surface S1 of the first lens E1 to the imaging surface S17 of the optical imaging lens assembly on an optical axis) is 4.07 mm, ImgH is a half of a diagonal length of an effective pixel region on the imaging surface of the optical imaging lens assembly, and a value of ImgH is 1.92 mm, a maximum field of view of the optical imaging lens assembly is 112.0°, and a ratio f/EPD of the total effective focal length f of the optical imaging lens assembly to an entrance pupil diameter (EPD) of the optical imaging lens assembly is 2.08.

Table 7 shows a table of basic parameters for the optical imaging lens assembly of Embodiment 4, and units of the curvature radius, the thickness/distance, and the focal length are all mm. Table 8 shows high-order coefficients applied to each aspheric mirror surface in Embodiment 4. A surface type of each aspheric surface may be defined by the formula (1) given in Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | 50.1026 | 0.2800 | 1.78 | 49.6 | −2.72 | 40.0000 |
| S2 | Aspheric | 2.0229 | 0.2589 | | | | −4.5095 |
| STO | Spherical | Infinite | 0.0015 | | | | |
| S3 | Aspheric | 3.8460 | 0.5531 | 1.78 | 49.6 | 2.52 | 3.2234 |
| S4 | Aspheric | −3.7547 | 0.0400 | | | | −30.3086 |
| S5 | Aspheric | 2.5125 | 0.2500 | 1.67 | 20.4 | −10.97 | 7.0149 |
| S6 | Aspheric | 1.7972 | 0.0500 | | | | −14.2559 |
| S7 | Aspheric | 2.2569 | 0.2800 | 1.65 | 23.5 | 5.61 | 2.6871 |
| S8 | Aspheric | 5.6723 | 0.0400 | | | | −91.6946 |
| S9 | Aspheric | 3.5078 | 0.6278 | 1.55 | 56.1 | 2.31 | 0.0000 |
| S10 | Aspheric | −1.8536 | 0.0300 | | | | −1.5902 |
| S11 | Aspheric | −7.6950 | 0.2800 | 1.65 | 23.5 | −7.43 | −2.1711 |
| S12 | Aspheric | 12.9776 | 0.0300 | | | | −29.4346 |
| S13 | Aspheric | 0.8253 | 0.3905 | 1.54 | 55.9 | −118.44 | −0.8056 |
| S14 | Aspheric | 0.6800 | 0.4458 | | | | −1.7387 |
| S15 | Spherical | Infinite | 0.2100 | 1.52 | 64.2 | | |
| S16 | Spherical | Infinite | 0.3000 | | | | |
| S17 | Spherical | Infinite | | | | | |

TABLE 8

| Surface number | A4 | A6 | A8 | A10 | A12 | A14 | A16 |
|---|---|---|---|---|---|---|---|
| S1 | 5.5450E−01 | −7.8082E−01 | 9.5036E−01 | −7.5516E−01 | 2.9072E−01 | 0.0000E+00 | 0.0000E+00 |
| S2 | 1.1402E+00 | −8.4850E−01 | 4.1031E+00 | −1.0571E+01 | 2.3958E+01 | 0.0000E+00 | 0.0000E+00 |
| S3 | 1.2887E−01 | −7.2546E−01 | 0.0000E+00 | 0.0000E+00 | 0.0000E+00 | 0.0000E+00 | 0.0000E+00 |
| S4 | −7.0752E−01 | 0.0000E+00 | 0.0000E+00 | 0.0000E+00 | 0.0000E+00 | 0.0000E+00 | 0.0000E+00 |
| S5 | −7.2764E−01 | 4.4338E−01 | −4.1753E+00 | 1.4316E+01 | −2.1322E+01 | 1 4942E+01 | 0.0000E+00 |
| S6 | −1.9291E−02 | −1.6734E+00 | 5.5518E+00 | −9.9272E+00 | 7.1060E+00 | 0.0000E+00 | 0.0000E+00 |
| S7 | −1.3466E−01 | −1.5042E+00 | 4.3585E+00 | 4.6098E+00 | −4.0476E+01 | 6.6429E+01 | −3.6087E+01 |
| S8 | 5.3536E−03 | 3.1350E−01 | −4.7922E+00 | 2.6350E+01 | −6.2450E+01 | 6.9754E+01 | −2.9999E+01 |
| S9 | −2.3887E−01 | 8.8636E−01 | −1.1965E+00 | 5.4994E−01 | 0.0000E+00 | 0.0000E+00 | 0.0000E+00 |
| S10 | −1.2530E−01 | 1.2730E−01 | −4.9493E−02 | 0.0000E+00 | 0.0000E+00 | 0.0000E+00 | 0.0000E+00 |
| S11 | 1.0835E+00 | −2.9350E+00 | 2.3980E+00 | 2.1444E+00 | −8.7096E+00 | 8.8219E+00 | −2.9590E+00 |
| S12 | 1.3422E+00 | −3.5891E+00 | 5.0408E+00 | −4.4673E+00 | 2.4563E+00 | −7.5382E−01 | 9.7530E−02 |
| S13 | −7.1201E−01 | −5.1761E−01 | 2.1959E+00 | −2.6136E+00 | 1.5906E+00 | −4.9968E−01 | 6.3639E−02 |
| S14 | −7.5333E−01 | 8.0812E−01 | −6.3929E−01 | 3.2632E−01 | −8.9940E−02 | 9.8461E−03 | 0.0000E+00 |

FIG. 8A shows a longitudinal aberration curve of the optical imaging lens assembly according to Embodiment 4 to represent deviation of a convergence focal point after light with different wavelengths passes through the lens. FIG. 8B shows an astigmatism curve of the optical imaging lens assembly according to Embodiment 4 to represent a tangential image surface curvature and a sagittal image surface curvature. FIG. 8C shows a distortion curve of the optical imaging lens assembly according to Embodiment 4 to represent distortion values corresponding to different fields of view. FIG. 8D shows a lateral color curve of the optical imaging lens assembly according to Embodiment 4 to represent deviation of different image heights on the imaging surface after the light passes through the lens. According to FIGS. 8A-8D, it can be seen that the optical imaging lens assembly provided in Embodiment 4 may achieve high imaging quality.

Embodiment 5

Figure 9:
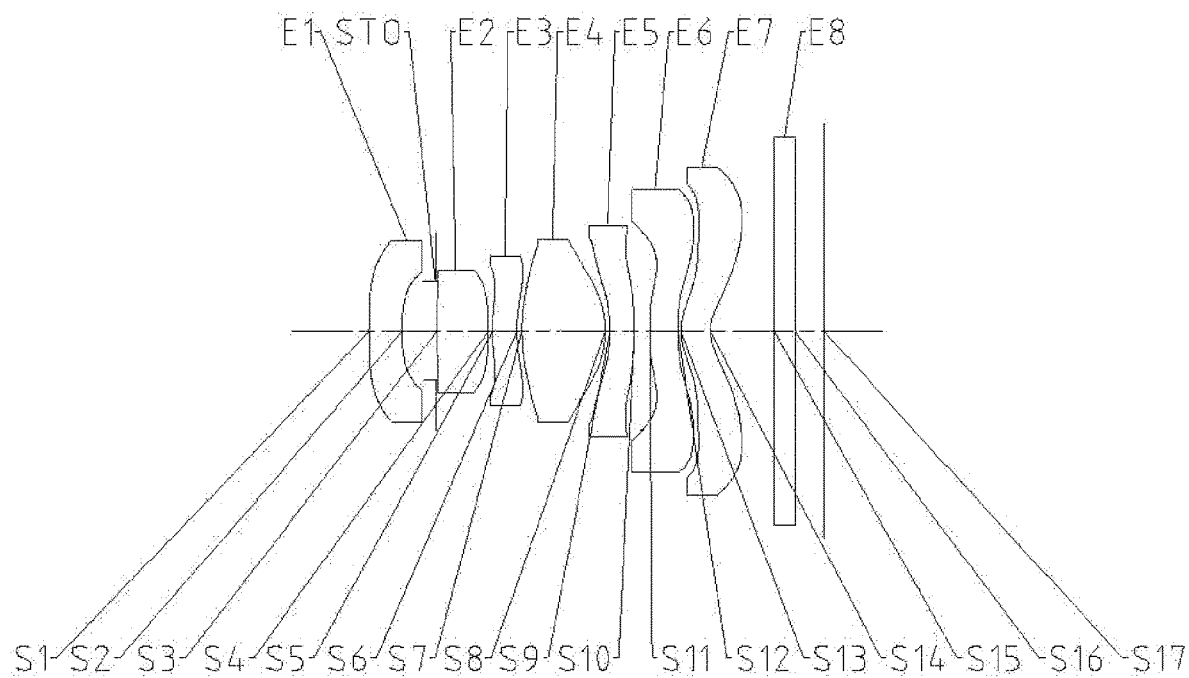
FIG. 9 shows a structure diagram of an optical imaging lens assembly according to Embodiment 5 of the disclosure.

An optical imaging lens assembly according to Embodiment 5 of the disclosure is described below with reference to FIGS. 9-10D. FIG. 9 is a structure diagram of an optical imaging lens assembly according to Embodiment 5 of the disclosure.

As shown in FIG. 9, the optical imaging lens assembly sequentially includes, from an lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the optical imaging lens assembly is 1.96 mm, a TTL of the optical imaging lens assembly (i.e., a distance from the object-side surface S1 of the first lens E1 to the imaging surface S17 of the optical imaging lens assembly on an optical axis) is 4.65 mm, ImgH is a half of a diagonal length of an effective pixel region on the imaging surface of the optical imaging lens assembly, and a value of ImgH is 2.25 mm, a maximum field of view of the optical imaging lens assembly is 112.1°, and a ratio f/EPD of the total effective focal length f of the optical imaging lens assembly to an entrance pupil diameter (EPD) of the optical imaging lens assembly is 2.80.

Table 9 shows a table of basic parameters for the optical imaging lens assembly of Embodiment 5, and units of the curvature radius, the thickness/distance, and the focal length are all mm. Table 10 shows high-order coefficients applied to each aspheric mirror surface in Embodiment 5. A surface type of each aspheric surface may be defined by the formula (1) given in Embodiment 1.

TABLE 9

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | 100.0000 | 0.3350 | 1.78 | 49.6 | −3.86 | 29.8481 |
| S2 | Aspheric | 2.9147 | 0.3402 | | | | −26.7911 |
| STO | Spherical | Infinite | 0.0150 | | | | |
| S3 | Aspheric | 11.6815 | 0.5262 | 1.55 | 56.1 | 7.55 | −0.7981 |
| S4 | Aspheric | −6.2859 | 0.0400 | | | | −43.5341 |
| S5 | Aspheric | 2.0576 | 0.2500 | 1.67 | 20.4 | −29.34 | 5.8071 |
| S6 | Aspheric | 1.7717 | 0.0500 | | | | −9.5225 |
| S7 | Aspheric | 1.8353 | 0.8601 | 1.55 | 56.1 | 1.53 | 2.1246 |
| S8 | Aspheric | −1.2844 | 0.0482 | | | | −0.2684 |
| S9 | Aspheric | −2.2728 | 0.2500 | 1.67 | 20.4 | −9.17 | 3.2815 |
| S10 | Aspheric | −3.7684 | 0.1565 | | | | 4.5658 |
| S11 | Aspheric | 25.0259 | 0.2879 | 1.65 | 23.5 | −278.44 | −2.3012 |
| S12 | Aspheric | 21.8734 | 0.0300 | | | | −29.4346 |
| S13 | Aspheric | 0.6864 | 0.2992 | 1.54 | 55.9 | −8.70 | −0.8768 |
| S14 | Aspheric | 0.5073 | 0.6545 | | | | −2.6137 |
| S15 | Spherical | Infinite | 0.2100 | 1.52 | 64.2 | | |
| S16 | Spherical | Infinite | 0.3000 | | | | |
| S17 | Spherical | Infinite | | | | | |

TABLE 10

| Surface number | A4 | A6 | A8 | A10 | A12 | A14 | A16 |
|---|---|---|---|---|---|---|---|
| S1 | 3.8796E−01 | −3.6084E−01 | 3.5839E−01 | −2.1437E−01 | 5.8541E−02 | 0.0000E+00 | 0.0000E+00 |
| S2 | 8.5178E−01 | −6.3294E−01 | 2.4771E+00 | −5.0508E+00 | 7.8361E+00 | 0.0000E+00 | 0.0000E+00 |

TABLE 10-continued

| Surface number | A4 | A6 | A8 | A10 | A12 | A14 | A16 |
|---|---|---|---|---|---|---|---|
| S3 | 1.4237E−01 | −3.9344E−01 | 0.0000E+00 | 0.0000E+00 | 0.0000E+00 | 0.0000E+00 | 0.0000E+00 |
| S4 | −5.9247E−01 | 0.0000E+00 | 0.0000E+00 | 0.0000E+00 | 0.0000E+00 | 0.0000E+00 | 0.0000E+00 |
| S5 | −5.5016E−01 | −5.5965E−01 | 1.5411E+00 | −6.8697E+00 | 1.4518E+01 | −1.1482E+01 | 0.0000E+00 |
| S6 | −1.2506E−01 | −1.7577E−01 | −8.5824E−02 | 1.5768E−01 | −4.6567E−02 | 0.0000E+00 | 0.0000E+00 |
| S7 | −3.9596E−01 | 6.9329E−01 | −1.2832E+00 | 2.2407E+00 | −3.3563E+00 | 2.8091E+00 | −9.5090E−01 |
| S8 | −1.0195E+00 | 5.3471E+00 | −1.5073E+01 | 2.6417E+01 | −2.6966E+01 | 1.4510E+01 | −3.1636E+00 |
| S9 | −1.0801E+00 | 6.1707E+00 | −1.7522E+01 | 3.0879E+01 | −3.2129E+01 | 1.7983E+01 | −4.1995E+00 |
| S10 | −1.5465E−02 | 2.4440E−01 | −1.2431E+00 | 2.5177E+00 | −2.0136E+00 | 6.1414E−01 | −3.8808E−02 |
| S11 | 0.0000E+00 | 0.0000E+00 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 | 0.0000E+00 | 0.0000E+00 |

Figure 10A:
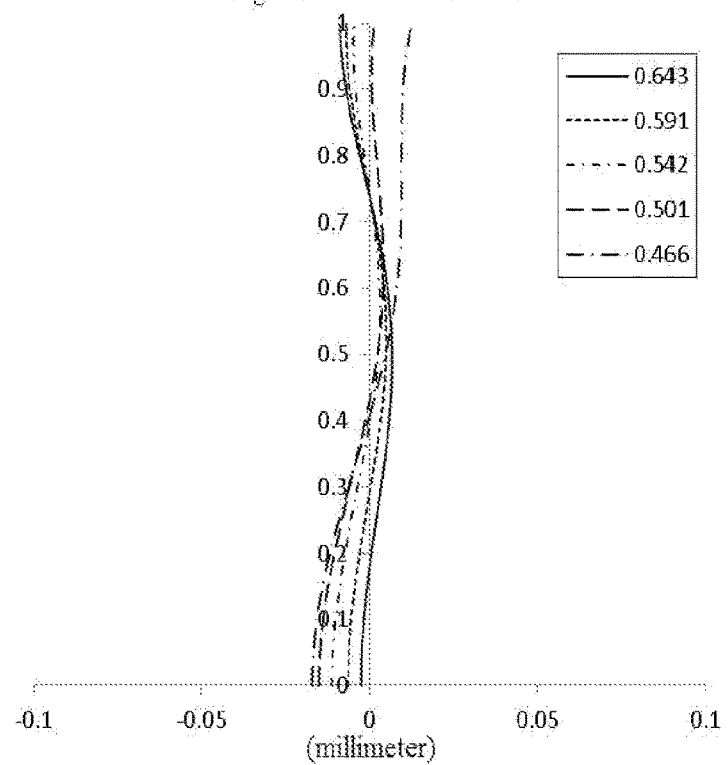
FIGS. 10A-10D show a longitudinal aberration curve, an astigmatism curve, a distortion curve and a lateral color curve of an optical imaging lens assembly according to Embodiment 5 respectively.
Figure 10B:
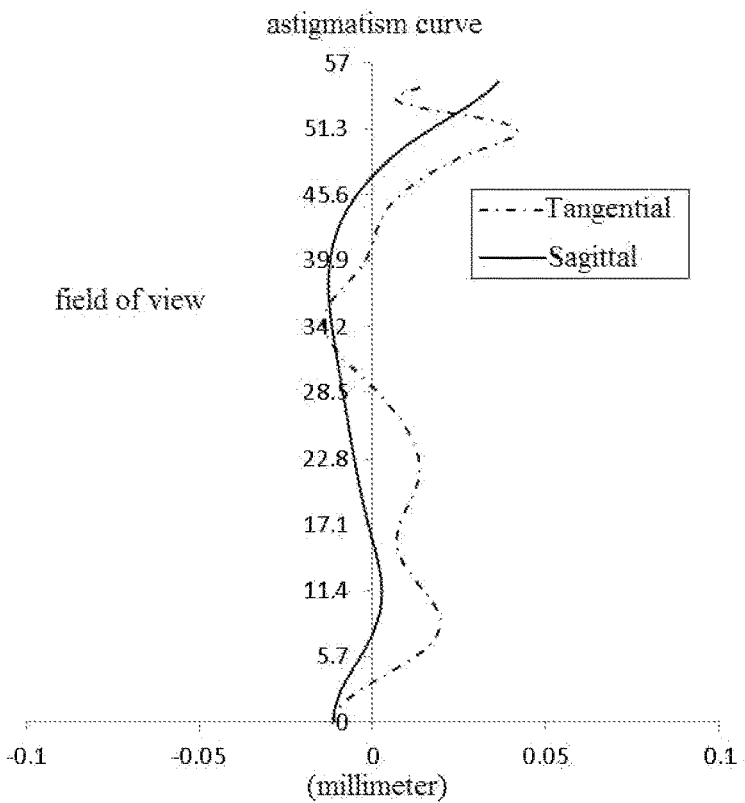
Figure 10C:
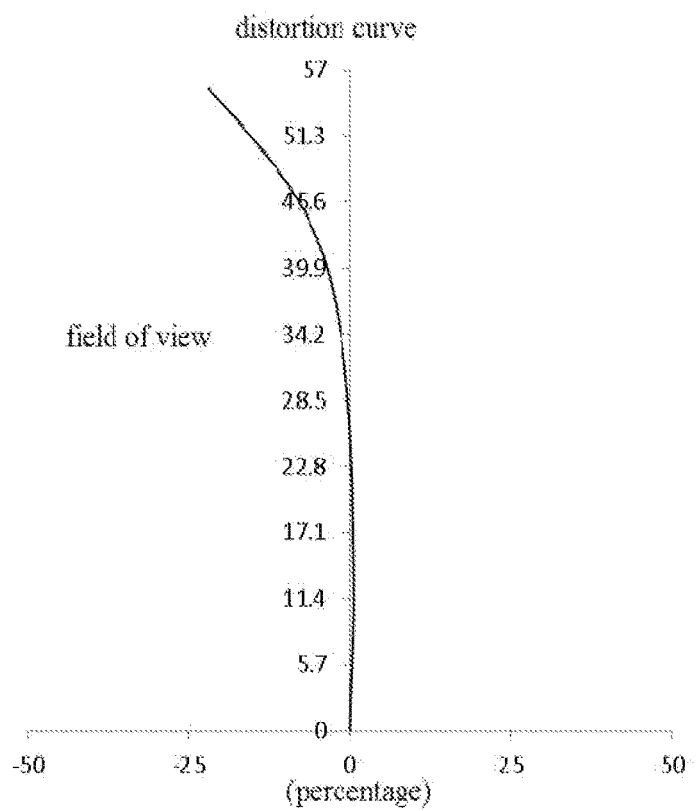
Figure 10D:
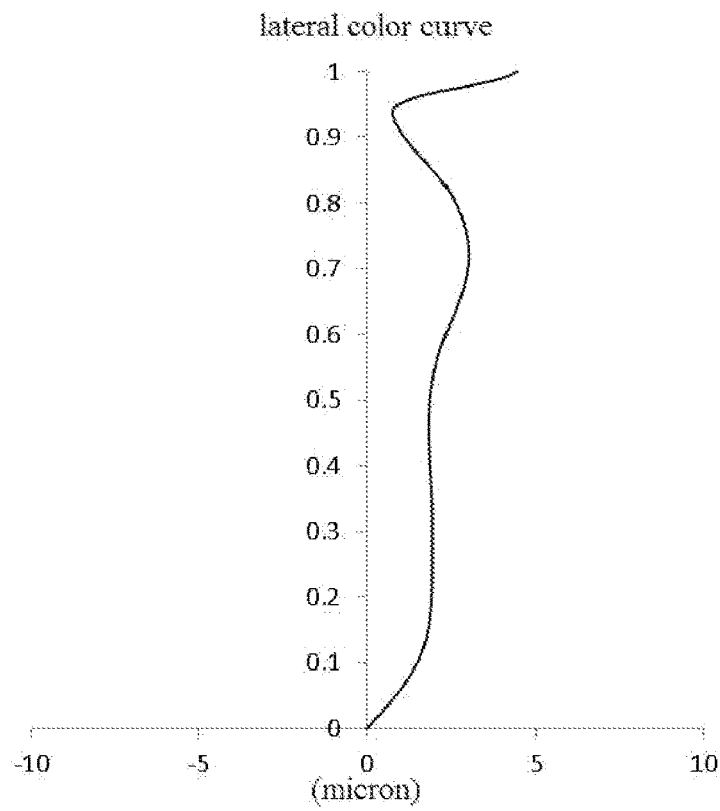

FIG. 10A shows a longitudinal aberration curve of the optical imaging lens assembly according to Embodiment 5 to represent deviation of a convergence focal point after light with different wavelengths passes through the lens. FIG. 10B shows an astigmatism curve of the optical imaging lens assembly according to Embodiment 5 to represent a tangential image surface curvature and a sagittal image surface curvature. FIG. 10C shows a distortion curve of the optical imaging lens assembly according to Embodiment 5 to represent distortion values corresponding to different fields of view. FIG. 10D shows a lateral color curve of the optical imaging lens assembly according to Embodiment 5 to represent deviation of different image heights on the imaging surface after the light passes through the lens. According to FIGS. 10A-10D, it can be seen that the optical imaging lens assembly provided in Embodiment 5 may achieve high imaging quality.

Embodiment 6

Figure 11:
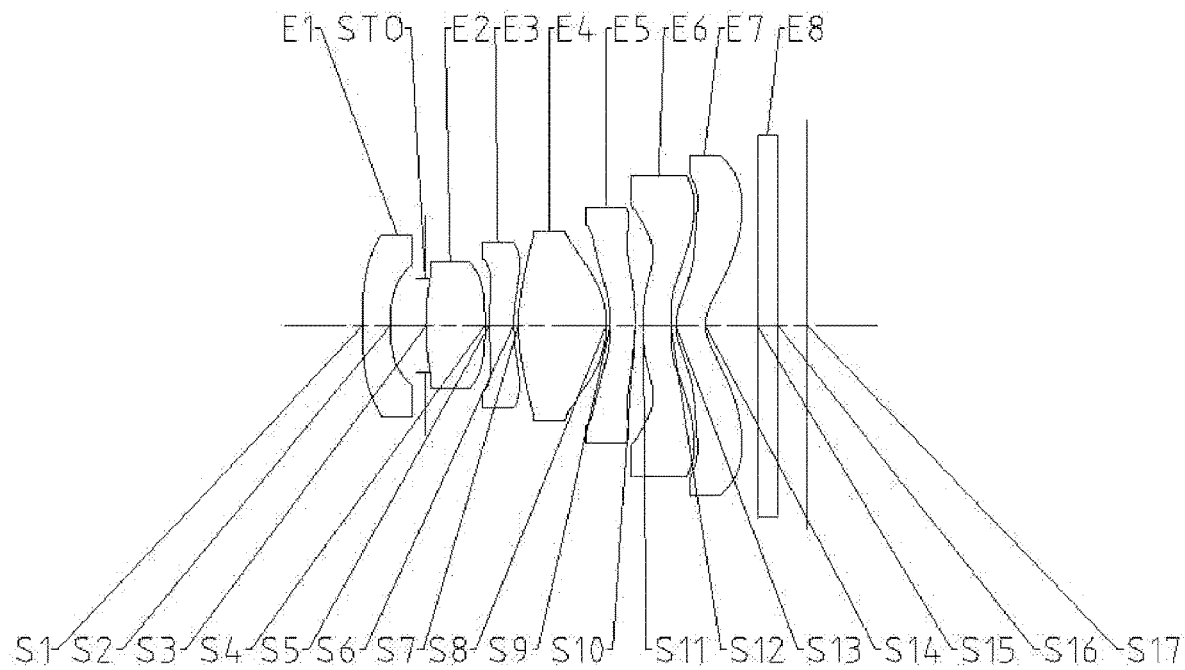
FIG. 11 shows a structure diagram of an optical imaging lens assembly according to Embodiment 6 of the disclosure.

An optical imaging lens assembly according to Embodiment 6 of the disclosure is described below with reference to FIGS. 11-12D. FIG. 11 is a structure diagram of an optical imaging lens assembly according to Embodiment 6 of the disclosure.

As shown in FIG. 11, the optical imaging lens assembly sequentially includes, from an lens E3, a fourth lens E4, a fifth lens E5, a sixth lens E6, a seventh lens E7, an optical filter E8 and an imaging surface S17.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the optical imaging lens assembly is 1.88 mm, a TTL of the optical imaging lens assembly (i.e., a distance from the object-side surface S1 of the first lens E1 to the imaging surface S17 of the optical imaging lens assembly on an optical axis) is 4.54 mm, ImgH is a half of a diagonal length of an effective pixel region on the imaging surface of the optical imaging lens assembly, and a value of ImgH is 2.25 mm, a maximum field of view of the optical imaging lens assembly is 120.1°, and a ratio f/EPD of the total effective focal length f of the optical imaging lens assembly to an entrance pupil diameter (EPD) of the optical imaging lens assembly is 2.80.

Table 11 shows a table of basic parameters for the optical imaging lens assembly of Embodiment 6, and units of the curvature radius, the thickness/distance, and the focal length are all mm. Table 12 shows high-order coefficients applied to each aspheric mirror surface in Embodiment 6. A surface type of each aspheric surface may be defined by the formula (1) given in Embodiment 1.

TABLE 11

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspheric | 25.0000 | 0.2800 | 1.65 | 23.5 | −3.74 | 29.8481 |
| S2 | Aspheric | 2.1949 | 0.3560 | | | | −39.6173 |
| STO | Spherical | Infinite | 0.0096 | | | | |
| S3 | Aspheric | 3.4338 | 0.5989 | 1.55 | 56.1 | 4.70 | −40.9489 |
| S4 | Aspheric | −9.6064 | 0.0420 | | | | −43.5341 |
| S5 | Aspheric | 2.2789 | 0.2500 | 1.67 | 20.4 | −17.35 | 6.3580 |
| S6 | Aspheric | 1.8212 | 0.0500 | | | | −7.4684 |

TABLE 11-continued

| Surface number | Surface type | Curvature radius | Thickness/ distance | Material Refractive index | Abbe number | Focal length | Conic coefficient |
|---|---|---|---|---|---|---|---|
| S7 | Aspheric | 1.8971 | 0.9029 | 1.55 | 56.1 | 1.55 | 1.7935 |
| S8 | Aspheric | −1.2774 | 0.0400 | | | | −0.1473 |
| S9 | Aspheric | −2.3269 | 0.2500 | 1.67 | 20.4 | −8.85 | 2.9201 |
| S10 | Aspheric | −3.9972 | 0.0854 | | | | 4.5836 |
| S11 | Aspheric | 11.1957 | 0.2800 | 1.65 | 23.5 | −94.03 | −2.3012 |
| S12 | Aspheric | 9.3624 | 0.0524 | | | | −29.4346 |
| S13 | Aspheric | 0.6715 | 0.3018 | 1.54 | 55.9 | −8.68 | −0.8769 |
| S14 | Aspheric | 0.4947 | 0.5276 | | | | −2.2912 |
| S15 | Spherical | Infinite | 0.2100 | 1.52 | 64.2 | | |
| S16 | Spherical | Infinite | 0.3000 | | | | |
| S17 | Spherical | Infinite | | | | | |

TABLE 12

| Surface number | A4 | A6 | A8 | A10 | A12 | A14 | A16 |
|---|---|---|---|---|---|---|---|
| S1 | 3.6289E−01 | −3.8169E−01 | 3.3038E−01 | −1.7483E−01 | 3.9433E−02 | 0.0000E+00 | 0.0000E+00 |
| S2 | 1.1027E+00 | −1.7347E+00 | 4.5318E+00 | −6.9807E+00 | 6.9850E+00 | 0.0000E+00 | 0.0000E+00 |
| S3 | 2.0320E−01 | −2.8868E−01 | 0.0000E+00 | 0.0000E+00 | 0.0000E+00 | 0.0000E+00 | 0.0000E+00 |
| S4 | −5.7271E−01 | 0.0000E+00 | 0.0000E+00 | 0.0000E+00 | 0.0000E+00 | 0.0000E+00 | 0.0000E+00 |
| S5 | −5.2562E−01 | −3.1659E−01 | 2.5211E−01 | −2.8736E+00 | 5.9690E+00 | −4.3596E+00 | 0.0000E+00 |
| S6 | −1.7453E−01 | 2.4983E−01 | −9.6078E−01 | 9.5540E−01 | −3.8270E−01 | 0.0000E+00 | 0.0000E+00 |
| S7 | −3.9026E−01 | 5.5129E−01 | −3.5839E−01 | −6.0411E−01 | 1.1961E+00 | −7.5086E−01 | 1.5657E−01 |
| S8 | −6.3311E−01 | 2.1621E−01 | −3.6445E+00 | 3.5852E+00 | −1.6386E+00 | 7.0030E−02 | 1.4717E−01 |
| S9 | −7.0764E−01 | 2.7894E+00 | −4.7900E+00 | 5.3160E+00 | −3.7279E+00 | 1.4499E+00 | −2.3751E−01 |
| S10 | 8.4061E−02 | −6.3482E−01 | 1.5693E+00 | −1.6061E+00 | 8.7825E−01 | −2.6365E−01 | 3.3717E−02 |
| S11 | 0.0000E+00 | 0.0000E+00 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 | 0.0000E+00 | 0.0000E+00 |

Figure 12A:
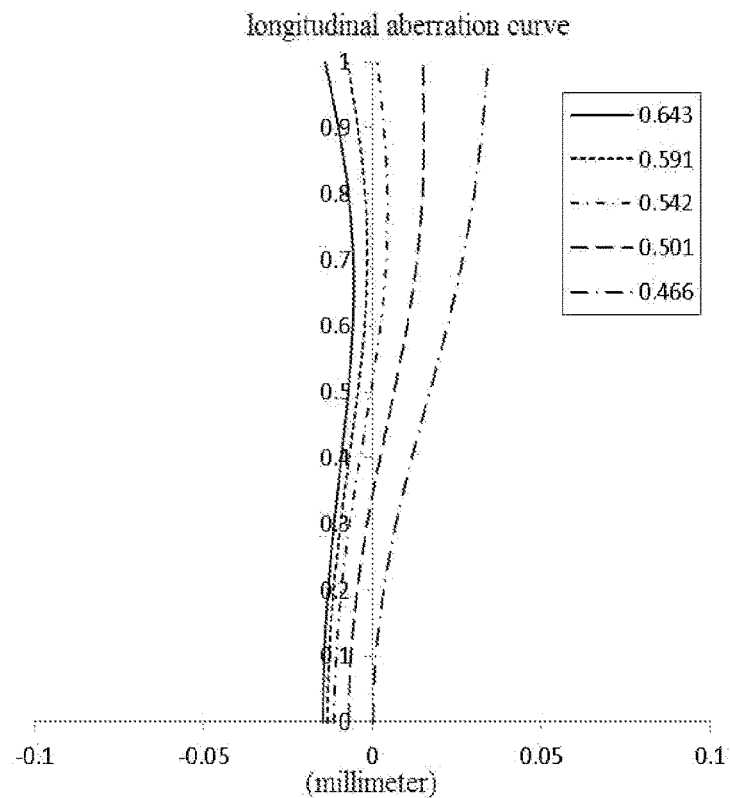
FIGS. 12A-12D show a longitudinal aberration curve, an astigmatism curve, a distortion curve and a lateral color curve of an optical imaging lens assembly according to Embodiment 6 respectively.
Figure 12B:
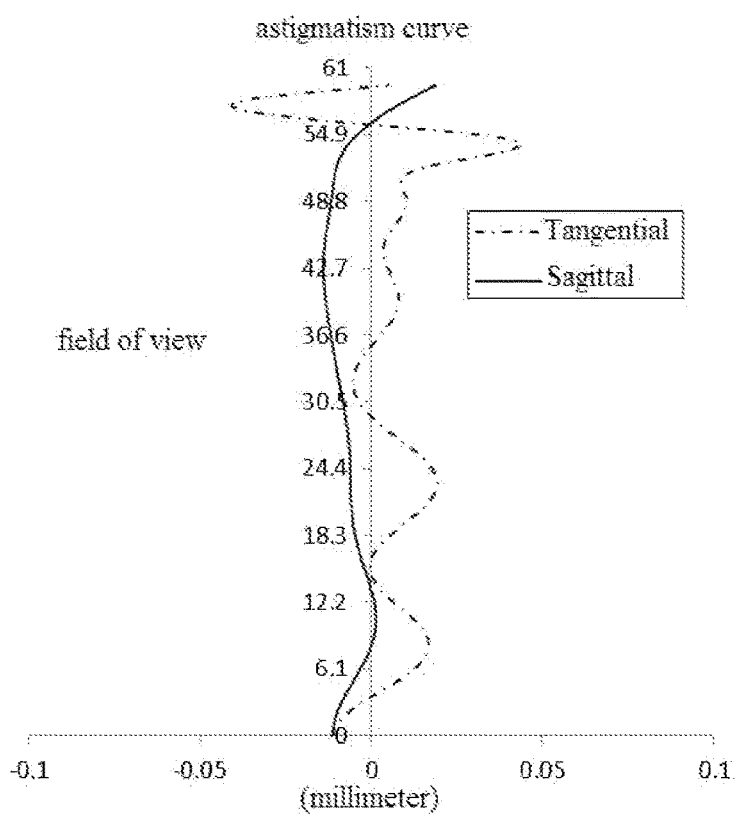
Figure 12C:
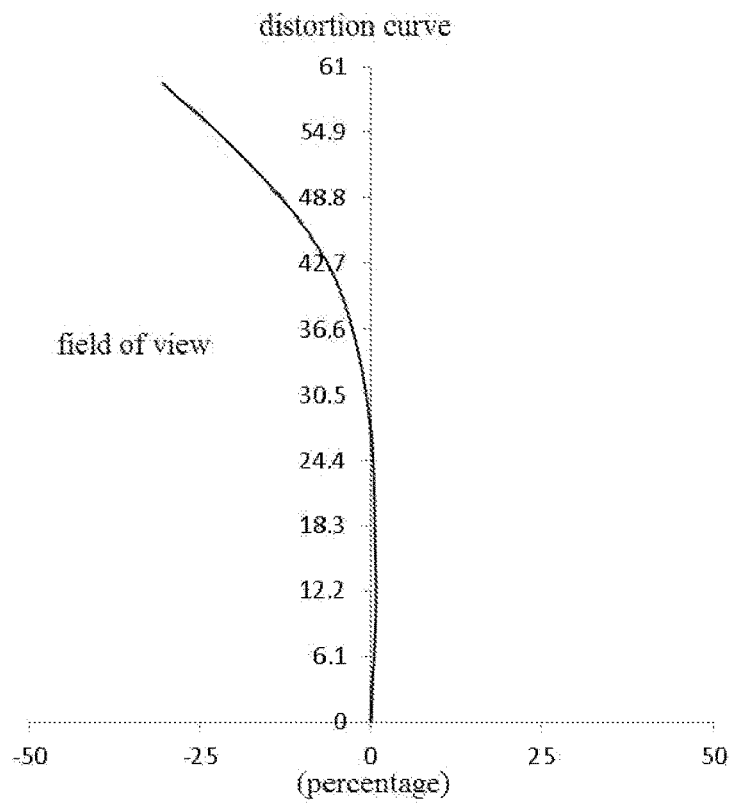
Figure 12D:
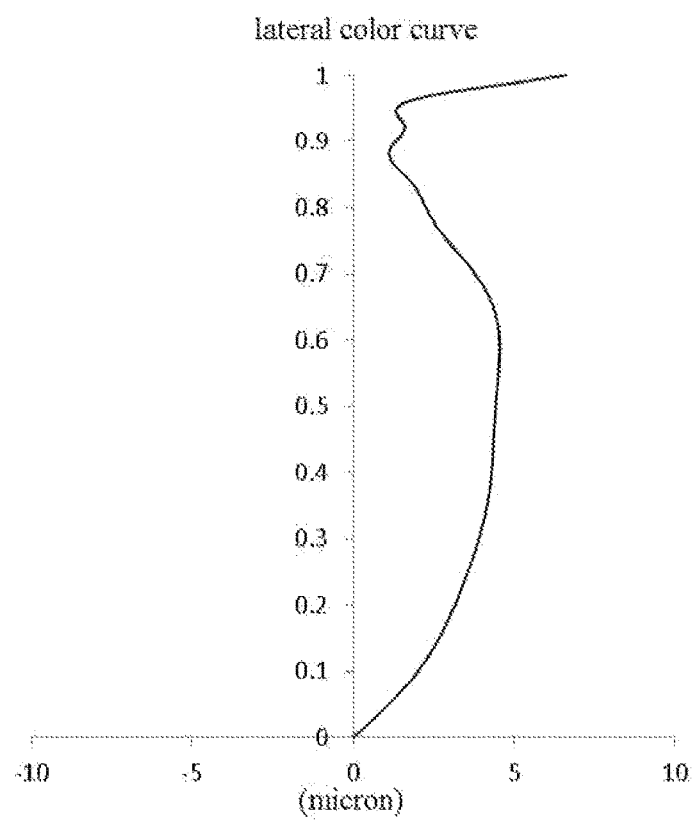

FIG. 12A shows a longitudinal aberration curve of the optical imaging lens assembly according to Embodiment 6 to represent deviation of a convergence focal point after light with different wavelengths passes through the lens. FIG. 12B shows an astigmatism curve of the optical imaging lens assembly according to Embodiment 6 to represent a tangential image surface curvature and a sagittal image surface curvature. FIG. 12C shows a distortion curve of the optical imaging lens assembly according to Embodiment 6 to represent distortion values corresponding to different fields of view. FIG. 12D shows a lateral color curve of the optical imaging lens assembly according to Embodiment 6 to represent deviation of different image heights on the imaging surface after the light passes through the lens. According to FIGS. 12A-12D, it can be seen that the optical imaging lens assembly provided in Embodiment 6 may achieve high imaging quality.

From the above, Embodiment 1 to Embodiment 6 meet a relationship shown in Table 13 respectively.

TABLE 13

| Conditional expression/ embodiment | 1 | 2 | 3 | 4 | 5 | 6 |
|---|---|---|---|---|---|---|
| DT12/DT61 | 0.45 | 0.46 | 0.51 | 0.53 | 0.54 | 0.50 |
| ImgH/TTL | 0.45 | 0.46 | 0.46 | 0.47 | 0.48 | 0.50 |
| f/f1 + f/f7 | −0.87 | −0.82 | −0.94 | −0.65 | −0.73 | −0.72 |
| f2/(R3 − R4) | 0.43 | 0.47 | 0.32 | 0.33 | 0.42 | 0.36 |
| f/f45 | 1.04 | 1.25 | 1.29 | 0.97 | 1.07 | 1.01 |

TABLE 13-continued

| Conditional expression/ embodiment | 1 | 2 | 3 | 4 | 5 | 6 |
|---|---|---|---|---|---|---|
| f67/f23 | −1.27 | −0.63 | −0.66 | −1.97 | −0.90 | −1.34 |
| (R1 − R2)/ (R1 + R2) | 0.96 | 0.92 | 0.93 | 0.92 | 0.94 | 0.84 |
| R6/R5 | 0.79 | 0.71 | 1.13 | 0.72 | 0.86 | 0.80 |
| [R7/f4 + R12/f6] | 0.87 | 1.12 | 0.88 | 1.34 | 1.12 | 1.12 |
| TD/SL | 0.87 | 0.86 | 0.90 | 0.88 | 0.88 | 0.90 |
| CT6/ET6 | 0.58 | 0.42 | 0.45 | 0.45 | 0.61 | 0.49 |
| (R13 + R14)/R10 | −0.43 | −0.93 | −0.92 | −0.81 | −0.32 | −0.29 |
| ET3/ET2 | 0.92 | 0.98 | 0.87 | 0.83 | 0.84 | 0.77 |
| ET4/ET5 | 0.87 | 1.08 | 0.82 | 1.20 | 0.78 | 0.80 |
| SAG42/(SAG42 + SAG51) | 0.60 | 0.56 | 0.52 | 0.47 | 0.64 | 0.64 |
| (CT1 + CT2)/(CT4 + CT5) | 0.76 | 0.82 | 0.86 | 0.92 | 0.78 | 0.76 |
| T12/ΣAT | 0.55 | 0.49 | 0.41 | 0.58 | 0.52 | 0.58 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly with only seven lenses with refractive power, sequentially comprising, from an object side to an image side along an optical axis:
   a first lens with a negative refractive power, an object-side surface thereof being a convex surface;
   a second lens with a refractive power;
   a third lens with a refractive power;
   a fourth lens with a positive refractive power;
   a fifth lens with a refractive power;
   a sixth lens with a negative refractive power; and
   a seventh lens with a negative refractive power, wherein
   a maximum field of view (FOV) of the optical imaging lens assembly satisfies: $105°<FOV<125°$;
   a curvature radius R10 of an image-side surface of the fifth lens, a curvature radius R13 of an object-side surface of the seventh lens and a curvature radius R14 of an image-side surface of the seventh lens satisfy: $-1.0<(R13+R14)/R10<0$.

2. The optical imaging lens assembly according to claim 1, wherein a maximum effective radius DT12 of an image-side surface of the first lens and a maximum effective radius DT61 of an object-side surface of the sixth lens satisfy: $0.3<DT12/DT61<0.8$.

3. The optical imaging lens assembly according to claim 1, wherein TTL is a distance from the object-side surface of the first lens to an imaging surface of the optical imaging lens assembly on the optical axis, and ImgH is a half of a diagonal length of an effective pixel region on the imaging surface of the optical imaging lens assembly, TTL and ImgH satisfy: $0.3<ImgH/TTL<0.8$.

4. The optical imaging lens assembly according to claim 1, wherein a total effective focal length f of the optical imaging lens assembly, an effective focal length f1 of the first lens and an effective focal length f7 of the seventh lens satisfy: $-1.0<f/f1+f/f7<0$.

5. The optical imaging lens assembly according to claim 1, wherein an effective focal length f2 of the second lens, a curvature radius R3 of an object-side surface of the second lens and a curvature radius R4 of an image-side surface of the second lens satisfy: $0<f2/(R3-R4)<1.0$.

6. The optical imaging lens assembly according to claim 1, wherein a total effective focal length f of the optical imaging lens assembly and a combined focal length f45 of the fourth lens and the fifth lens satisfy: $0.5<f/f45<1.5$.

7. The optical imaging lens assembly according to claim 1, wherein a combined focal length f23 of the second lens and the third lens and a combined focal length f67 of the sixth lens and the seventh lens satisfy: $-2.0<f67/f23<-0.5$.

8. The optical imaging lens assembly according to claim 1, wherein a curvature radius R1 of the object-side surface of the first lens and a curvature radius R2 of an image-side surface of the first lens satisfy: $0<(R1-R2)/(R1+R2)<1.0$.

9. The optical imaging lens assembly according to claim 1, wherein a curvature radius R5 of an object-side surface of the third lens and a curvature radius R6 of an image-side surface of the third lens satisfy: $0.5<R6/R5<1.5$.

10. The optical imaging lens assembly according to claim 1, wherein an effective focal length f4 of the fourth lens, an effective focal length f6 of the sixth lens, a curvature radius R7 of an object-side surface of the fourth lens and a curvature radius R12 of an image-side surface of the sixth lens satisfy: $0.5<|R7/f4+R12/f6|<1.5$.

11. The optical imaging lens assembly according to claim 1, wherein a center thickness CT6 of the sixth lens on the optical axis and an edge thickness ET6 of the sixth lens satisfy: $0.3<CT6/ET6<0.8$.

12. The optical imaging lens assembly according to claim 1, wherein an edge thickness ET2 of the second lens and an edge thickness ET3 of the third lens satisfy: $0.5<ET3/ET2<1.0$.

13. The optical imaging lens assembly according to claim 1, wherein an edge thickness ET4 of the fourth lens and an edge thickness ET5 of the fifth lens satisfy: $0.5<ET4/ET5<1.5$.

14. The optical imaging lens assembly according to claim 1, wherein SAG42 is a distance from an intersection point of an image-side surface of the fourth lens and the optical axis to an effective radius vertex of the image-side surface of the fourth lens on the optical axis, and SAG51 is a distance from an intersection point of an object-side surface of the fifth lens and the optical axis to an effective radius vertex of the object-side surface of the fifth lens on the optical axis, SAG42 and SAG51 satisfy: $0.3<SAG42/(SAG42+SAG51)<0.8$.

15. The optical imaging lens assembly according to claim 1, wherein a center thickness CT1 of the first lens on the optical axis, a center thickness CT2 of the second lens on the optical axis, a center thickness CT4 of the fourth lens on the optical axis and a center thickness CT5 of the fifth lens on the optical axis satisfy: $0.5<(CT1+CT2)/(CT4+CT5)<1.0$.

16. The optical imaging lens assembly according to claim 1, wherein a spacing distance T12 of the first lens and the second lens on the optical axis and a sum $\Sigma AT$ of spacing distances of any two adjacent lenses in the first lens to the seventh lens on the optical axis satisfy: $0.3<T12/\Sigma AT<0.8$.

17. The optical imaging lens assembly according to claim 1, further comprising a diaphragm, wherein
   TD is a distance from the object-side surface of the first lens to an image-side surface of the seventh lens on the optical axis, and SL is a distance from the diaphragm to an imaging surface of the optical imaging lens assembly on the optical axis, TD and SL satisfy: $0.5<TD/SL<1.0$.

18. The optical imaging lens assembly according to claim 1, wherein the image-side surface of the first lens is a concave surface.

\* \* \* \* \*